United States Patent [19]

Monroe et al.

[11] Patent Number: 5,645,618
[45] Date of Patent: Jul. 8, 1997

[54] METHOD FOR MAKING AN ABRASIVE ARTICLE

[75] Inventors: Larry D. Monroe, Eagan; Thomas E. Wood, Stillwater, both of Minn.

[73] Assignee: Minnesota Mining and Manufacturing Company, St. Paul, Minn.

[21] Appl. No.: 575,181

[22] Filed: Dec. 19, 1995

Related U.S. Application Data

[60] Division of Ser. No. 333,224, Nov. 2, 1994, Pat. No. 5,593,467, which is a continuation-in-part of Ser. No. 151,540, Nov. 12, 1993, abandoned.

[51] Int. Cl.$^6$ .................................................... B24D 3/00
[52] U.S. Cl. ............................................. 51/309; 501/153
[58] Field of Search ............................ 51/293, 295, 298, 51/309; 501/153

[56] References Cited

U.S. PATENT DOCUMENTS

| | | | |
|---|---|---|---|
| 2,278,442 | 4/1942 | Heany | 106/65 |
| 2,310,953 | 2/1943 | Heany | 106/62 |
| 2,347,685 | 5/1944 | Heany | 106/65 |
| 2,360,841 | 10/1944 | Baumann, Jr. et al. | 51/309 |
| 2,369,709 | 2/1945 | Baumann, Jr. et al. | 51/309 |
| 2,725,286 | 11/1955 | Coes, Jr. | 51/298 |
| 2,947,056 | 8/1960 | Csordas et al. | 25/157 |
| 3,450,515 | 6/1969 | Amero | 51/307 |
| 3,491,491 | 1/1970 | Ueltz | 51/309 |
| 3,802,893 | 4/1974 | Kiger et al. | 501/119 |
| 3,808,015 | 4/1974 | Seufert | 106/65 |
| 3,838,980 | 10/1974 | Gynra | 23/301 |
| 3,853,688 | 12/1974 | D'Ambrosio | 161/178 |
| 3,916,585 | 11/1975 | Barks | 51/309 |
| 4,031,177 | 6/1977 | Auriol et al. | 264/65 |
| 4,086,067 | 4/1978 | Busch et al. | 51/296 |
| 4,623,364 | 11/1986 | Cottringer et al. | 51/309 |
| 4,786,292 | 11/1988 | Janz et al. | 51/309 |
| 4,881,951 | 11/1989 | Wood et al. | 51/309 |
| 5,009,676 | 4/1991 | Rue et al. | 51/309 |
| 5,034,360 | 7/1991 | Bartels et al. | 501/127 |
| 5,137,852 | 8/1992 | Morgan et al. | 501/95 |
| 5,139,978 | 8/1992 | Wood | 501/127 |
| 5,157,832 | 10/1992 | Morgan et al. | 29/888.1 |
| 5,164,348 | 11/1992 | Wood | 501/127 |
| 5,185,299 | 2/1993 | Wood et al. | 501/95 |
| 5,194,072 | 3/1993 | Rue et al. | 51/309 |
| 5,219,806 | 6/1993 | Wood | 51/309 |
| 5,236,471 | 8/1993 | Van Dijen | 51/293 |
| 5,244,477 | 9/1993 | Rue et al. | 51/293 |
| 5,284,809 | 2/1994 | Van Dijen | 501/127 |
| 5,302,368 | 4/1994 | Harato et al. | 501/153 |

FOREIGN PATENT DOCUMENTS

| | | | |
|---|---|---|---|
| 2018584 | 12/1990 | Canada | C25B 13/02 |
| 2071593 | 12/1992 | Canada | C01F 7/00 |
| 0277730 | 8/1988 | European Pat. Off. | C01F 7/02 |
| 0281265 | 9/1988 | European Pat. Off. | C01F 7/02 |
| 0293163A2 | 11/1988 | European Pat. Off. | C04B 35/10 |
| 0394501 | 10/1990 | European Pat. Off. | C04B 35/10 |
| 0395091 | 10/1990 | European Pat. Off. | D01F 9/08 |
| 0435677A2 | 7/1991 | European Pat. Off. | C04B 35/10 |
| 0494362A2 | 7/1992 | European Pat. Off. | C04B 35/80 |
| 0543347A1 | 5/1993 | European Pat. Off. | C01F 7/02 |
| 0594455A2 | 4/1994 | European Pat. Off. | C04B 35/10 |
| 0524436B1 | 8/1994 | Germany | C01F 7/02 |
| 2186588 | 12/1989 | United Kingdom | B24D 3/06 |
| WO88/02742 | 4/1988 | WIPO | C04B 41/87 |
| WO92/01646 | 2/1992 | WIPO | C04B 35/10 |
| WO94/07970 | 4/1994 | WIPO | C09K 3/14 |
| WO94/14722 | 7/1994 | WIPO | C04B 35/10 |

OTHER PUBLICATIONS

"Sintered Alumina Abrasives," *Applied Mineralogy*, L. Coes, Jr., pp. 63–64, 1971.

"Powders, Interfaces, and Processing: Alumina as a Case Study," Roosen et al., *Ceramic Microstructures '86, Material Science Research*, vol. 21, pp. 433–446 1986.

"Processing of Highly Concentrated Aqueous α-Alumina Suspensions Stabilized with Polyelectrolytes," Cesarano III et al., *J. Am. Ceram. Soc.*, 71, [12], 1062–67 (1988).

*Primary Examiner*—Deborah Jones
*Attorney, Agent, or Firm*—Gary L. Griswold; Walter N. Kirn, Jr.; Gregory D. Allen

[57] ABSTRACT

Methods for making abrasive articles (e.g., coated abrasives, bonded wheels, and three dimensional, low density abrasives) comprising crystalline ceramic, alpha alumina-based abrasive grain.

57 Claims, 2 Drawing Sheets

METHOD FOR MAKING AN ABRASIVE ARTICLE

This is a divisional of U.S. Ser. No. 08/08/333,224, filed Nov. 11, 1994, now U.S. Pat. No. 5,593,467 (the disclosure of which is incorporated herein by reference), which is a continuation-in-part of U.S. Ser. No. 08/151,540, filed Nov. 12, 1993, now abandoned.

FIELD OF THE INVENTION

The present invention relates to alpha alumina-based ceramic abrasive grain and methods for making the same. The abrasive grain can be incorporated into any of a variety of abrasive products.

DESCRIPTION OF THE RELATED ART

Early synthetic abrasive grains were produced by fusion processes. The alumina sources used in such processes are generally bauxite or Bayer process alumina. In such processes, the ceramic materials are melted in a furnace and then cooled to form a dense brick or quenched in water to produce fine crystals.

In recent years, abrasive grains have been prepared according to various "sol gel" processes. In a sol gel process, a hydrated form of alumina (i.e., alpha alumina monohydrate or boehmite) is typically mixed with water and acid to produce a colloidal dispersion or sol. The colloidal dispersion of boehmite is dewatered to form grit particulate precursor, which is typically calcined and then sintered. During the calcining step, boehmite converts to transitional alumina(s). During the sintering step, transitional alumina(s) in the grit particulate is transformed to alpha alumina, which is then densified. Sol gel processes are described, for example, in U.S. Pat. No. 5,035,369 (Winkler et al.), U.S. Pat. No. 4,770,671 (Monroe et al.), and U.S. Pat. No. 4,314,827 (Leitheiser et al.), and U.S. Pat. No. 5,164,348 (Wood).

At the present time, sol gel processes are utilized for the production of ceramic abrasive grains. Boehmite is a key constituent in the process, because: it can be obtained in a form comprising 99 to 100 percent by weight pure AlOOH; it can be obtained in a form having a submicrometer particle size; and it readily forms colloidal dispersions. Boehmite, however, is a fairly expensive starting material, and thus, suitable alternative methods have been sought for providing ceramic alpha alumina-based abrasive grain.

SUMMARY OF THE INVENTION

The present invention provides a first method for preparing crystalline ceramic, alpha alumina-based, abrasive grain, the method comprising the steps of:

(a) preparing a dispersion comprising a liquid medium and a sufficient amount of alumina particles which, after steps (b) and (c), provides a plurality of crystalline ceramic, alpha alumina-based abrasive grain having a hardness of at least 16 GPa (preferably, at least 18 GPa, more preferably, at least 19 GPa), a density of at least 3.58 g/cm$^3$ (preferably, at least 3.78 g/cm$^3$, more preferably, at least 3.88 g/cm$^3$), an average alpha alumina crystallite size of less than 2 micrometer (preferably, less than 1.5 micrometer, more preferably, less than 1 micrometer), and, on a theoretical oxide basis, less than 0.3 percent by weight SiO$_2$ and no more than 0.4 percent by weight Na$_2$O, based on the total weight of the abrasive grain; the alumina particles being selected from the group consisting of: alpha alumina particles, transitional alumina particles containing less than 10% by weight chemically bound water, and mixtures thereof, the alumina particles having an average size of less than 2 micrometer (preferably, less than 1.5 micrometer, more preferably, less than 1 micrometer), the dispersion containing no more than 1% by weight alpha alumina monohydrate, based on the total solids content of the dispersion (i.e., based on the weight of the dispersion minus the total weight of liquid media present in the dispersion);

(b) deliquifying the dispersion to provide alpha alumina-based abrasive grain precursor material;

(c) sintering the precursor material at a temperature no greater than 1600.0° C. and at a pressure no greater than 100.0 atm for a time sufficient to provide the plurality of abrasive grain.

Preferably, the ceramic abrasive grain includes, on a theoretical oxide basis, no more than 0.4 percent by weight CaO. Herein, when reference is made to definition of materials on a theoretical oxide basis, no specific definition of phases present is meant. Rather, the reference is to a mass balance.

In another aspect, the present invention provides a second method for preparing crystalline ceramic, alpha alumina-based, abrasive grain, the method comprising the steps of:

(a) preparing a dispersion comprising a liquid medium, a sufficient amount of sintering aid material selected from the group consisting of yttrium oxide, cerium oxide, praseodymium oxide, samarium oxide, ytterbium oxide, neodymium oxide, lanthanum oxide, gadolinium oxide, dysprosium oxide, erbium oxide, precursors thereof, and combinations thereof, and a sufficient amount of alumina particles which, after steps (b) and (c), provides a plurality of crystalline ceramic, alpha alumina-based abrasive grain comprising at least 2 percent (preferably, at least 2.5 percent, more preferably, at least 3 percent) by weight, on a theoretical oxide basis, Y$_2$O$_3$, Ce$_2$O$_3$, Pr$_2$O$_3$, Sm$_2$O$_3$, Yb$_2$O$_3$, Nd$_2$O$_3$, La$_2$O$_3$, Gd$_2$O$_3$, Dy$_2$O$_3$, Er$_2$O$_3$, or a combination thereof, based on the total weight of the abrasive grain, having a hardness of at least 16 GPa, a density of at least 3.58 g/cm$^3$, and an average alpha alumina crystallite size of less than 2 micrometer; the alumina particles being selected from the group consisting of: alpha alumina particles, transitional alumina particles containing less than 10% by weight chemically bound water, and mixtures thereof, the alumina particles having an average size of less than 2 micrometer, wherein the dispersion comprises at least about 65 percent by weight (preferably, at least about 75 percent by weight, more preferably, at least about 80 percent by weight) of the alumina particles, based on the total theoretical Al$_2$O$_3$ content of the dispersion;

(b) deliquifying the dispersion to provide alpha alumina-based abrasive grain precursor material;

(c) sintering the precursor material at a temperature no greater than 1600.0° C. and at a pressure of no greater than 100.0 atm for a time sufficient to provide the plurality of abrasive grain.

Preferably, the resulting abrasive has, on a theoretical oxide basis, less than 0.3 percent by weight SiO$_2$, no more than 0.4 percent by weight Na$_2$O, and no more than 0.4 percent by weight CaO, based on the total weight of said abrasive grain. The dispersion can further comprise a material selected from the group of: zirconium oxide, hafnium oxide, chromium oxide, precursors thereof, and combinations thereof.

In another aspect, the present invention provides a third method for preparing crystalline ceramic, alpha alumina-based abrasive grain, the method comprising the steps of:

(a) preparing a dispersion comprising a liquid medium, a sufficient amount of alumina particles, and a sufficient amount of sintering aid material which, after steps (b) and (c), provides a plurality of crystalline ceramic, alpha alumina-based abrasive grain having a hardness of at least 16 GPa (preferably, at least 18 GPa, more preferably, at least 19 GPa), a density of at least 3.58 g/cm$^3$ (preferably, at least 3.78 g/cm$^3$, more preferably, at least 3.88 g/cm$^3$), an average alpha alumina crystallite size of less than 2 micrometer (preferably, less than 1.5 micrometer, more preferably, less than 1 micrometer), and, on a theoretical oxide basis, less than 0.3 percent by weight $SiO_2$ and no more than 0.4 percent by weight $Na_2O$, based on the total weight of the abrasive grain, the alumina particles being selected from the group consisting of: alpha alumina particles, transitional alumina particles containing less than 10% by weight chemically bound water, and mixtures thereof, the alumina particles having an average size of less than 2 micrometer (preferably, less than 1.5 micrometer, more preferably, less than 1 micrometer), the dispersion containing no more than 1% by weight alpha alumina monohydrate, based on the total solids content of the dispersion;

(b) deliquifying the dispersion to provide alpha alumina-based abrasive grain precursor material;

(c) sintering the precursor material at a temperature no greater than 1600.0° C. and at a pressure no greater than 100.0 atm for a time sufficient to provide the plurality of abrasive grain.

The term "sintering aid material" as used herein refers to a material (or precursor thereof) that promotes densification of a ceramic body that otherwise will not densify or will require a higher temperature or pressure to achieve the same degree of densification. Preferred sintering aid materials include iron oxide, magnesium oxide, manganese oxide, zinc oxide, cerium oxide, cobalt oxide, titanium oxide, nickel oxide, yttrium oxide, praseodymium oxide, samarium oxide, ytterbium oxide, neodymium oxide, lanthanum oxide, gadolinium oxide, dysprosium oxide, erbium oxide, precursors thereof, and combinations thereof. More preferably, the sintering aid material is a combination of (a) a precursor salt of magnesium and (b) a precursor salt of a metal selected from the group of: cerium, praseodymium, samarium, ytterbium, neodymium, yttrium, lanthanum, gadolinium, dysprosium, erbium, and combinations thereof.

In another aspect, the present invention provides a fourth method for preparing crystalline ceramic, alpha alumina-based, abrasive grain, the method comprising the steps of:

(a) preparing a dispersion comprising a first liquid medium and alumina particles, the alumina particles being selected from the group consisting of: alpha alumina particles, transitional alumina particles containing less than 10% by weight chemically bound water, and mixtures thereof, the alumina particles having an average size of less than 2 micrometer (preferably, less than 1.5 micrometers, more preferably, less than 1 micrometer), the dispersion containing no more than 1% by weight alpha alumina monohydrate, based on the total solids content of the dispersion;

(b) deliquifying the dispersion to provide alpha alumina-based abrasive grain precursor material;

(c) impregnating the precursor material with an impregnating material comprising sintering aid material and a second liquid medium;

(d) calcining the impregnated precursor material;

(e) sintering the calcined material at a temperature no greater than 1600.0° C. and at a pressure no greater than 100.0 atm for a time sufficient to provide a plurality of crystalline ceramic, alpha alumina-based abrasive grain having a hardness of at least 16 SPa (preferably, at least 18 GPa, more preferably, at least 19 GPa), a density of at least 3.58 g/cm$^3$ (preferably, at least 3.78 g/cm$^3$, more preferably, at least 3.88 g/cm$^3$), and an average alpha alumina crystallite size of less than 2 micrometer (preferably, less than 1.5 micrometer, more preferably, less than 1 micrometer (wherein the amount of the alumina particles in the dispersion and the amount of the sintering aid material is sufficient to provide the abrasive grain with the specified hardness, density, and crystallite size. Preferably, the alpha alumina-based abrasive grain provided by this method has, on a theoretical oxide basis, less than 0.3 percent by weight $SiO_2$ and no more than 0.4 percent by weight $Na_2O$, based on the total weight of the abrasive grain. More preferably, the alpha alumina-based abrasive grain provided by this method has, on a theoretical oxide basis, less than 0.3 percent by weight $SiO_2$, no more than 0.4 percent by weight $Na_2O$, and no more than 0.4 percent by weight CaO, based on the total weight of the abrasive grain.

In another aspect, the present invention provides a fifth method for preparing crystalline ceramic, alpha alumina-based, abrasive grain, the method comprising the steps of:

(a) preparing a dispersion comprising a first liquid medium, a first sintering aid material, and alumina particles, the alumina particles being selected from the group consisting of: alpha alumina particles, transitional alumina particles containing less than 10% by weight chemically bound water, and mixtures thereof, the alumina particles having an average size of less than 2 micrometer (preferably, less than 1.5 micrometer, more preferably, less than 1 micrometer), the dispersion containing no more than 1% by weight alpha alumina monohydrate, based on the total solids content of the dispersion;

(b) deliquifying the dispersion to provide alpha alumina-based abrasive grain precursor material;

(c) impregnating the precursor material with an impregnating material comprising a second sintering aid material and a second liquid medium;

(d) calcining the impregnated precursor material;

(e) sintering the calcined material at a temperature no greater than 1600.0° C. and at a pressure no greater than 100.0 atm for a time sufficient to provide a plurality of crystalline ceramic, alpha alumina-based abrasive grain having a hardness of at least 16 GPa (preferably, at least 18 GPa, more preferably, at least 19 GPa), a density of at least 3.58 g/cm$^3$ (preferably, at least 3.78 g/cm$^3$, more preferably, at least 3.88 g/cm$^3$), and an average alpha alumina crystallite size of less than 2 micrometer (preferably, less than 1.5 micrometer, more preferably, less than 1 micrometer)

(wherein the amount of the alumina particles in the dispersion and the amounts of the first and second sintering aid materials are sufficient to provide the abrasive grain with the specified hardness, density, and crystallite size). Preferably, the abrasive grain provided by this method has, on a theoretical oxide basis, less than 0.3 percent by weight $SiO_2$ and no more than 0.4 percent by weight $Na_2O$, based on the total weight of the abrasive grain. More preferably, the abrasive grain provided by this method has, on a theoretical oxide basis, less than 0.3 percent by weight $SiO_2$, no more than 0.4 percent by weight $Na_2O$, and no more than 0.4 percent by weight CaO, based on the total weight of the abrasive grain. The first and second sintering aid materials can be the same or different.

In another aspect, the present invention provides a sixth method for preparing crystalline ceramic, alpha alumina-based, abrasive grain, the method comprising the steps of:

(a) preparing a dispersion comprising a first liquid medium and alumina particles, the alumina particles being selected from the group consisting of: alpha alumina particles, transitional alumina particles containing less than 10% by weight chemically bound water and mixtures thereof, the alumina particles having an average size of less than 2 micrometer, wherein the dispersion comprises at least 50.0 percent by weight (preferably, at least about 60 percent by weight, more preferably, at least about 75 percent by weight) of the alumina particles, based on the total theoretical $Al_2O_3$ content of the dispersion, and wherein the dispersion contains no more than 50.0 percent by weight alpha alumina monohydrate, based on the solids content of the dispersion;

(b) deliquifying the dispersion to provide alpha alumina-based abrasive grain precursor material;

(c) impregnating the precursor material with an impregnating material comprising sintering aid material and a second liquid medium;

(d) calcining the impregnated precursor material;

(e) sintering the calcined material at a temperature no greater than 1600.0° C. and at a pressure no greater than 100.0 atm for a time sufficient to provide a plurality of crystalline ceramic, alpha alumina-based abrasive grain having a hardness of at least 16 GPa (preferably, at least 18 GPa, more preferably, at least 19 GPa), a density of at least 3.58 g/cm$^3$ (preferably, at least 3.78 g/cm$^3$, more preferably, at least 3.88 g/cm$^3$), and an average alpha alumina crystallite size of less than 2 micrometer (preferably, less than 1.5 micrometer, more preferably, less than 1 micrometer)

(wherein the amount of the alumina particles in the dispersion and the amount of the sintering aid material is sufficient to provide the abrasive grain with the specified hardness, density, and crystallite size).

Preferably, the sintering aid material for the sixth method is selected from the group of: iron oxide, magnesium oxide, manganese oxide, zinc oxide, cerium oxide, cobalt oxide, titanium oxide, nickel oxide, yttrium oxide, praseodymium oxide, samarium oxide, ytterbium oxide, neodymium oxide, lanthanum oxide, gadolinium oxide, dysprosium oxide, erbium oxide, precursors thereof, and combinations thereof. The sintering aid material can be a salt of a metal selected from the group of: cerium, praseodymium, samarium, ytterbium, neodymium, lanthanum, gadolinium, dysprosium, erbium, and combinations thereof. Another preferred sintering aid material is a combination of (a) a precursor salt of magnesium and (b) a precursor salt of a metal selected from the group of: cerium, praseodymium, samarium, ytterbium, neodymium, yttrium, lanthanum, gadolinium, dysprosium, erbium, and combinations thereof.

One preferred alpha alumina-based abrasive grain made by methods according to the present invention includes alpha alumina crystallites that are randomly oriented with respect to adjacent crystallites (i.e., angles between adjacent crystallite planes vary by more than ±15%) and rare earth aluminate platelets that are present between at least some of the alpha alumina crystallites, the abrasive grain having a hardness of at least 16 GPa (preferably, at least 18 GPa, more preferably, at least 19 GPa), a density of at least 3.58 g/cm$^3$ (preferably, at least 3.78 g/cm$^3$, more preferably, at least 3.88 g/cm$^3$), and an average alpha alumina crystallite size of less than 2 micrometer (preferably, less than 1.5 micrometer, more preferably, less than 1 micrometer). Further, in preparing this preferred abrasive grain according to the methods described herein, any limits placed on $Na_2O$, $SiO_2$, and CaO can be exceeded, although preferably this abrasive grain has, on a theoretical oxide basis, less than 0.3 percent by weight $SiO_2$, no more than 0.4 percent by weight $Na_2O$, and no more than 0.4 percent by weight CaO, based on the total weight of the abrasive grain.

Preferably, the dispersion comprises sufficient "alumina particles" to provide the alpha alumina-based abrasive grain with an $Al_2O_3$ content (on a theoretical oxide basis) of at least about 85 percent (preferably, at least about 90 percent) by weight, based on the total weight of the abrasive grain.

Relative to conventional materials obtained from sol gel processes, abrasive grain prepared according to the method of the present invention has a relatively rough outer surface, which increases adherence to substrates through the utilization of various binding agents or binders.

The method of the present invention can be characterized by the general absence (to advantage) of the use of: colloidal dispersions of alpha alumina monohydrate or boehmite; fusion techniques; and electrophoretic techniques, to achieve the desired results.

Abrasive grain, as described herein, can be incorporated into abrasive products such as coated abrasives, bonded abrasives, and lofty, three-dimensional abrasives.

DETAILED DESCRIPTION OF THE PREFERRED EMBODIMENTS

Figure 1:
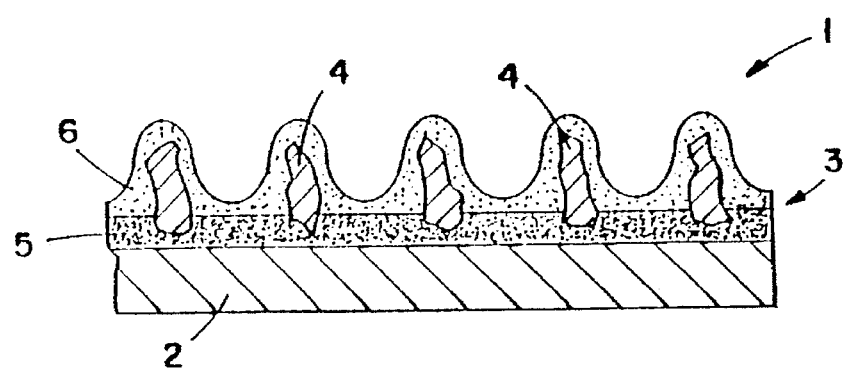
FIG. 1 is a fragmentary cross-sectional schematic view of a coated abrasive product, incorporating therein abrasive grain according to the present invention.

In one aspect, the present invention concerns a method of producing dense, crystalline ceramic abrasive grain primarily comprising alpha alumina ($\alpha$-$Al_2O_3$) from a process that does not depend on the use of boehmite as a principal source of alumina. Despite the general avoidance of the use of boehmite in the method according to the present invention, the method can be used to generate useful abrasive ceramic abrasive grains having a hardness of at least 16 GPa, preferably and routinely at least 18 GPa, and generally about 19 to 21 GPa; a density of 3.58 g/cm$^3$, preferably and typically at least 3.78 g/cm$^3$, and generally about 3.80 to 3.92 g/cm$^3$ (measured with a helium stereopycnometer); and a microstructure comprising generally uniform crystallites (crystalline regions having high angle boundaries) having an average size (longest dimension) generally less than 2 micrometer, preferably, less than 1.5 micrometer, and more preferably, less than 1 micrometer) in average size.

Uniformity of crystallite size in the abrasive grain generally depends on the uniformity of the alumina particles in starting material, especially if the starting material is alpha alumina.

Preparation of the Dispersion of Alumina

The dispersion initially formed contains non-hydrous alumina material such as alpha alumina particles, particles of transitional alumina(s), or both. The solids in the initial dispersion, preferably comprise by weight no more than about 1% (preferably, less than 0.5%), hydrous alumina (e.g., alpha aluminum oxide monohydrate (boehmite)), and can be essentially free of the presence of hydrous alumina (e.g., essentially free of boehmite). The term "non-hydrous" as used herein refers to alumina material containing no more than about 10% by weight (preferably, no more than about 7% by weight) chemically bound water. Further, with respect to the term "non-hydrous," no reference is meant to surface water (i.e., water not chemically bound). A preferred alpha alumina material is commercially available under the trade designation "AKP-50" from Sumitomo Chemical of Japan.

Various transitional aluminas that are suitable for use in processes according to the present invention include, but are not limited to, chi alumina, gamma alumina, eta alumina, and mixtures thereof. A suitable transitional alumina which includes chi alumina is commercially available, for example, under the trade designation "AA100W" from Alcan Corp. of Cleveland, Ohio.

It is preferred that the particulate alumina material, from which the dispersion is formed, comprise powdered material having a particle size distribution such that no more than about 0.5% by weight is greater than about 2 micrometers, and preferably such that no more than 5.0% by weight is greater than 1 micrometer in size (diameter or longest dimension). Preferably, the particle size is on the order of at least about 75% by weight smaller than about 0.7 micrometer, and, more preferably, 99% by weight is less than about 0.7 micrometer. Such particulate material typically not only readily forms the dispersion but also provides a useful precursor to the desired sintered product. Particle sizes within the preferred ranges can be obtained from commercially available materials, or can be prepared, for example, by crushing or ball milling (wet or dry) an alumina source.

The dispersion can further comprise soluble aluminum salts such as basic aluminum carboxylates, basic aluminum nitrates, basic aluminum chlorides, partially hydrolyzed aluminum alkoxides, and combinations thereof. Methods for making basic aluminum salts, for example, are known in the art and include those disclosed in U.S. Pat. No. 3,957,598 (Merkl), U.S. Pat. No. 3,340,205 (Hayes), U.S. Pat. No. 3,983,221 (Rademachers et al.), U.S. Pat. No. 3,927,184 (Hodgson), U.S. Pat. No. 3,476,509 (Jones), and U.S. Pat. No. 2,127,504, and British Patent Document No. 1,193,258, the disclosures of which are incorporated herein by reference. Due to cost considerations, the amount of soluble aluminum salts added to the dispersion typically provides less than 20 percent by weight (preferably, less than 10 percent by weight) of the aluminum content of the dispersion.

A variety of liquid media, organic or non-organic, can be utilized as the liquid for the dispersion. Suitable liquids include water, alcohols (typically $C_1$–$C_6$ alcohols), hexane, and heptane. In general, water (most preferably, deionized water) is the preferred and most widely utilized liquid medium, due primarily to convenience and cost. Further, water provides a convenient and desirable liquid medium for various additives or adjuvants.

In general, the ratio of liquid medium to powdered alumina is dependent upon the particle size distribution as it relates to the surface area of the powdered material. If water is used, generally a weight ratio within the range of about 1:6 (i.e., liquid medium to powdered raw material) to 15:1 is usable, although ratios outside of this range may also be useful. It is typically preferred to avoid the use of excess liquids in order to minimize the extent of subsequent deliquifying. It is, however, necessary to use a sufficient amount of liquid so the thoroughly mixed dispersion can be readily handled or moved, for example, by pouring, siphoning, pumping, or extruding.

It is foreseen that if the alumina has relatively high surface area, for example, about 200–300 $m^2/g$ (e.g., that commercially available under the trade designation "AA100W" from Alcan), a weight ratio of water to powder of about 5:1 to 10:1 is preferred (about 6:1 to 9:1 most preferred). If, however, the alumina has a relatively low surface area, for example, less than about 20 $m^2/g$ (e.g., that commercially available under the trade designation "A16" from Alcoa), a weight ratio of about 1:6 to 2:1 is preferred.

Preferably, the solids content of the dispersion is maximized, and the solids (i.e., particles) are dispersed homogeneously therein. Preferably, the size of the pores in the material dried from the dispersion is minimized. Further, it is preferred that the distribution of pore sizes is as narrow as possible.

In general, the liquid medium, dispersed alumina, sintering aid material, if present, and other optional additives are mixed until a homogenous slurry or stable dispersion is formed. This mixture, which is sometimes referred to herein as a "stable slip," is one in which, in general, the solids of the slurry do not appear by visual inspection to begin to separate or settle upon standing for about 2 hours (due, it is believed, to the viscosity of the slurry). A stable dispersion can be obtained by thoroughly mixing the alumina, a dispersion aid, and any additional raw materials and additives into the liquid medium and reducing the size of and/or deagglomerating the particles in the dispersion until the resulting dispersion is homogeneous, and the individual alumina (powder) particles are substantially uniform in size and distribution. Suitable methods for mixing include ball milling, vibratory milling, attritor milling and/or high shear mixing (colloid mills). Pebble (e.g., ball, vibratory, attritor) milling techniques are generally most preferred because of their ability to readily reduce the size of the alumina starting material.

A dispersion prepared according to the method of the present invention is typically thixotropic. "Thixotropic," as used herein, is meant to describe a slurry that is viscous when under no stress, but has a low viscosity when a shear (e.g., mixing) is introduced. It generally comprises a chalky or milky liquid which can be easily poured or stirred, but which is sufficiently thick so that the solids do not settle within a two-hour period. A dispersion or slip prepared according to the methods described herein (including the examples) generally has a consistency of about that for latex paint. Undesirably lumpy or heterogenous mixtures tend to result from inadequate mixing. It is generally not possible to mix the dispersion for too long.

Sintering Aids

In the fourth, fifth, or sixth method according to the present invention, sintering aid material is impregnated into abrasive grain precursor after deliquifying and/or calcining the dispersion. Such methods will be further described hereinbelow, following description of the deliquifying process. The term "abrasive grain precursor," as utilized herein, refers to the dry material that results from deliquifying the dispersion, or calcined material. Herein "deliquifying" of the dispersion is sometimes referred to as "separating" the solids from the liquid(s) of the dispersion.

Sintering aid material can be included in the ceramic abrasive grain precursor by incorporation into the initially formed dispersion of the alumina material. Such introduction may include adding particles or a sol of the modifier directly to the dispersion of alumina. Preferably, such particles or particles making up the sol have an average particle size less than 1 micrometer. The term "dispersion" in this context is meant to identify the nature of the dispersion of alumina, sintering aid material, and any other adjuvant or modifier which may be colloidally dispersed therein. Suitable precursors of the sintering aid include hydrous forms or salts. A variety of such precursors may be used including nitrates, sulfates, acetates, and chlorides.

Preferably, the methods according to the present invention incorporate sufficient preferred sintering aid material into the material which is sintered, to provide crystalline ceramic, alpha alumina-based, abrasive grain having up to about 15 percent (more preferably, up to about 10 percent, even more preferably, in the range from about 1 to about 8 percent) by weight one or more oxides of iron, magnesium, manganese, zinc, cobalt, titanium, nickel, yttrium, praseodymium, samarium, ytterbium, neodymium, lanthanum, gadolinium, dysprosium, erbium, cerium, and combinations thereof (calculated on a theoretical oxide basis as $Fe_2O_3$, $MgO$, $MnO$, $ZnO$, $CoO$, $TiO_2$, $NiO$, $Y_2O_3$, $Pr_2O_3$, $Sm_2O_3$, $Yb_2O_3$, $Nd_2O_3$, $La_2O_3$, $Gd_2O_3$, $Dy_2O_3$, $Er_2O_3$, and $Ce_2O_3$, respectively).

Other materials which may be useful as sintering aid materials include europium oxide, terbium oxide, holmium oxide, lutetium oxide, thulium oxide, combinations thereof, and precursors thereof.

Suitable ceria sols for adding to the dispersion are described, for example, in the Assignee's co-pending application having U.S. Ser. No. 08/181,474 (Larmie), filed Jan. 12, 1994, which is a continuation of U.S. Ser. No. 07/951,443, filed Sep. 25, 1992, now abandoned, the disclosure of which is incorporated herein by reference.

It is specifically noted that certain rare earth oxides and divalent metal cations react with alumina during sintering to form hexagonal rare earth aluminates represented by the formula:

$LnMAl_{11}O_{19}$, wherein:

Ln is a lanthanide rare earth such as $La^{3+}$, $Nd^{3+}$, $Ce^{3+}$, $Pr^{3+}$, $Sm^{3+}$, $Gd^{3+}$, or $Eu^{3+}$; and M is a divalent metal cation such as $Ca^{2+}$, $Mg^{2+}$, $Mn^{2+}$, $Zn^{2+}$, $Ni^{2+}$, or $Co^{2+}$.

Such hexagonal rare earth aluminates typically exhibit a magnetoplumbite structure. Such aluminates generally form as platelets in the microstructure of the resulting sintered material. These platelets typically have a length of about 0.5–3 micrometers and a thickness of about 0.1 micrometer. Such platelets are typically associated with such characteristics as improved toughness. Generally, provision of at least about 1% (preferably, about 3% to about 5%), on a theoretical basis, of reactants to provide magnetoplumbite in the final sintered abrasive grain, is sufficient to provide beneficial effect.

The constituents forming the dispersion are first mixed together. The mixing technique can be any technique to preferably achieve a uniform and homogeneous dispersion. Such mixing techniques include high shear mixing, ultrasonic mixing, low shear mixing, ball milling, or any other conventional technique. The ball milling can be accomplished, for example, with alumina or zirconia balls. It is also within the scope of this invention to reduce the pressure on the dispersion during or after mixing to remove any undesired air bubbles.

Other Adjuvant(s) or Modifier(s)

Other adjuvant(s) or modifier(s) which can be added to the dispersion and/or impregnated in the abrasive grain precursor include zirconium oxide, chromium oxide, hafnium oxide, precursors thereof, and combinations thereof. Such materials may be incorporated into the final sintered ceramic abrasive grain, for example, for one or more of the following reasons: to increase the hardness of the resulting ceramic; to increase the toughness of the resulting ceramic; and/or to modify crystal structure (and thus grinding performance).

Suitable zirconia sols for adding to the dispersion are described, for example, in the Assignee's co-pending application having U.S. Ser. No. 08/239,926 (Larmie), filed May 9, 1994, which is a continuation of U.S. Ser. No. 07/951,654, filed Sep. 25, 1992, now abandoned, the disclosure of which is incorporated herein by reference.

Suitable precursors of the adjuvant(s) or modifier(s) include hydrous forms or salts. A variety of such precursors may be used including nitrates, sulfates, acetates, and chlorides.

Further, alumina precursors such as boehmite, soluble aluminum salts (e.g., basic aluminum carboxylates, basic aluminum nitrates, basic aluminum chlorides, partially hydrolyzed aluminum alkoxides, and combinations thereof), and combinations thereof can also be added to the dispersion and/or impregnated in the abrasive grain precursor.

Dispersion Aids

Dispersion aids may be used to improve the consistency or stability of the dispersion or slurry. Dispersion aids tend to help prevent or minimize settling and improve the homogenous nature of the slurry by helping to break down large agglomerates.

Preferred dispersion aids include strong acids (e.g., nitric acid) and bases (e.g., ammonium hydroxide), polyanionic polymers such as carboxylate functional polymers, (e.g., polyacrylic acids, polyacrylic acid copolymers, and polyacrylic acid salts), and basic aluminum salts such as basic aluminum chlorides and basic aluminum nitrates. Suitable carboxylate functional polymers are available, for example, under the trade designations "JONCRYL" from Johnson Wax, Inc., of Racine, Wis.; "CARBOPOL" from the B.F. Goodrich Co. of Cleveland, Ohio; "NOECRYL" from ICI Resins US of Wilmington, Mass.; and "VINAC" from Air Products and Chemicals, Inc., of Allentown, Pa.

The desired amount of dispersion aid is believed to depend on the surface area of the particles to be dispersed. Generally, the preferred amount of dispersion aid increases as the size of particles increases.

In general, for a dispersion employing strong acids or bases as dispersion aids, sufficient dispersion aid is used to render a pH of less than about 6 (preferably, about 2 to 3) or more than about 8 (preferably, about 8 to 10), respectively.

The most preferred strong acid dispersant is typically nitric acid. Dispersions employing nitric acid as the dispersant preferably contain about 2–15% by weight nitric acid, based upon total solids content of the dispersion. The stability of such dispersions may be improved by heat treating the dispersion, for example, by autoclaving it.

Dispersions employing polymeric or basic aluminum salt material as the dispersant preferably contain about 0.1 to about 4 percent by weight of such dispersant, based on the total solids content of the dispersion.

Defoamers

To facilitate the milling process, a defoamer may be added to the dispersion. Defoamers are helpful in decreasing foaming or frothing which would otherwise occur during milling or stirring. Suitable defoamers include citric acid and its salts. A defoamer is typically used in an amount corresponding to about 1% by weight of the aluminum oxide (on a theoretical oxide basis) present in the dispersion.

It is also within the scope of this invention to include other additives in the dispersion such as organic binders (e.g., polyethylene glycol, commercially available, for example, under the trade designation "CARBOWAX" from Union Carbide of Akron, Ohio) and organic solvent(s) (e.g., toluene and hexane). The amounts of these materials are selected to give a desired property (e.g., ease of processing, improved drying of the solids, improved green strength, and reduced foaming).

Materials Generally to be Avoided in the Dispersion and Resulting Solids

As will be seen from descriptions hereinbelow, a wide variety of materials may be incorporated into the dispersion in order to provide preferred ceramic product or to facilitate the sintering process. The presence of certain materials, however, is to be minimized or avoided.

For example, the solid material from the deliquified dispersion of the first, third, fourth, and fifth methods contains no more than 1% by weight (preferably, less than 0.5% by weight) alpha alumina monohydrate, and preferably no more than 1% by weight (more preferably, less than 0.5% by weight) crystalline alumina hydrate (i.e., alumina containing more than about 10% by weight chemically bound water), based on the total solids content of the dispersion. Hydrous alumina materials to be avoided include boehmite, gibbsite, and/or hygarillite, as it is a purpose of embodiments of the present invention to provide an alternative to boehmite processes, which typically require generation of a colloidal boehmite dispersion or sol.

Silica ($SiO_2$) is a contaminant or component in certain sources of alumina (e.g., bauxite). When sintered with alumina, silica typically reacts with the alumina to form mullite ($3Al_2O_3.2SiO_2$). In general, mullite is an undesired component in ceramic abrasive grains because it tends to render undesirable physical characteristics (i.e., a reduction in hardness). For this reason, the dispersion preferably contains a sufficiently low amount of silica (or precursor thereof) such that the final ceramic abrasive grain includes less than 0.3% (more preferably, less than about 0.1%) by weight silica, on a theoretical oxide basis calculated as $SiO_2$. In general, this limitation excludes alumina source materials such as bauxite, at least in significant amounts from the various solids that can be dispersed in the dispersion.

The final sintered ceramic abrasive grain prepared according to the present invention preferably has a calcium oxide content (calculated on a theoretical oxide basis as CaO) of less than 0.4% (preferably, less than about 0.1%) by weight, based on the total weight of the abrasive grain. Further, the sintered abrasive grain preferably has a sodium oxide content (calculated on a theoretical oxide basis as $Na_2O$) of less than 0.4% (more preferably, less than about 0.1%) by weight, based on the total weight of the abrasive grain. Because calcium oxide and sodium oxide (or precursors thereof) can be introduced into the dispersed solids from the liquid media, it is preferred that the amount of calcium oxide, sodium oxide, and/or precursors thereof present therein be minimized. For example, if the liquid media is water, deionized water is preferred. In general, the presence of sodium oxide or calcium oxide in the sintered grain in more than about 0.2% by weight, on a theoretical oxide basis, is associated with undesirable properties, namely lower hardness and/or density, and grinding performance. Alpha alumina (anhydrous), and chi alumina, containing less than 10% by weight chemically bound water, are commercially available (e.g., alpha alumina which is available under the trade designation "A16" from Alcoa Co. contains less than 0.1% by weight $SiO_2$, less than 0.2% by weight $Na_2O$ and less than 0.2% by weight CaO).

Deliquifying or Drying

In general, the dispersion is dried (deliquified) to a solid to enable the particulate material to be crushed or broken into grit material or abrasive grain precursor. That is, the solids are separated from the dispersion. Conventional means may be utilized to separate, dry, or deliquify (e.g., filtering, settling and decanting, rotoevaporating, and centrifuging). Air drying steps may be used, as well as various extrusion methods. Drying can be accomplished, for example, in a forced air oven at a temperature in the range of about 50° C. to about 200° C. (preferably, about 75° C. to about 125° C.). Generally, the dispersion is heated slowly while being dried to inhibit frothing and to reduce cracking. Typically, the dispersion is deliquified to remove at least 95 percent by weight of the liquid medium used to form the dispersion.

In general, minimizing or reducing the amount of air or gasses entrapped in the dispersion before drying (deliquifying) tends to decrease the probability of frothing. Less entrapped gasses generally can be correlated with a less porous microstructure, which is desirable. Degassing may be conducted, for example, by subjecting the dispersion to a vacuum, with a draw on the order of about 130 cm Hg (25 psi).

After the material is sufficiently deliquified such that it can be broken into grits, it can be crushed or shaped through any of a variety of means. For example, it may be crushed using a hammer mill, ball mill, or roll crusher. Any method of breaking the solid into smaller particles can be used, and the term "crushing" is meant to refer to any such method. Classification steps such as screening and/or air classification can be utilized to obtain selected particle sizes or size fractions. After crushing, the particle size can range from about 2 mm to 0.5 micrometer, typically between 1 mm to 10 micrometers.

Optional Shaping of the Dispersion

If rendered sufficiently thick or partially deliquified, the dispersion can be shaped by conventional means such as pressing, molding, coating, extrusion, cutting, or some combination of these steps, prior to drying, to a grit form. It can be done in stages, for example, by first forming a plastic mass of partially dried slurry through extrusion, then shaping the resulting plastic mass by any convenient method, and finally drying to produce a desired shape, for example, a rod, pyramid, disc, diamond, triangle, or cone.

If the abrasive grain precursor is shaped into a rod, the aspect ratio of the rod should be at least about 0.5 to 1, typically 1 to 1, preferably at least 2:1, more preferably at least 4:1, and most preferably at least 5:1. The cross section of the rod can be circular, rectangular, triangular, hexagonal, or the like. The rods can be made in a manner as described, for example, in U.S. Pat. No. 5,090,968 (Pellow), the disclosure of which is incorporated herein by reference for its teaching of how to make rods. Another preferred shape is a thin body having triangular, rectangular, circular, or other geometric shape. Such thin abrasive bodies have a front face and a back face, both of which have substantially the same geometric shape. The faces are separated by the thickness of the particle. The ratio of the length of the shortest facial dimension of such an abrasive particle to its thickness is at least 1:1, preferably at least 2:1, more preferably at least 5:1, and most preferably at least 6:1. A method for making such thin shaped abrasive grain is described in U.S. Pat. No. 5,201,916 (Berg et al.), the disclosure of which is incorporated herein by reference for its teaching thereto.

Impregnation of the Abrasive Grain Precursor with Sintering Aid Material and Optional Adjuvants or Modifiers Sintering aid material and optional adjuvants or modifiers (such as referenced above) can be incorporated into the grit material after deliquifying or drying, typically after the follow-up step of calcining. Precursors of various metal oxides, for example, can be incorporated by impregnation into the abrasive grain precursor. Calcined material typically contains interparticle pores about 500–3000 Angstrom in radius. Further, calcined material containing transitional alumina typically has intraparticle pores in the transitional alumina that are 40–80 Angstrom in radius. This impregnation can be accomplished, for example, by mixing a liquid solution containing metal oxide precursor (e.g., salts) with abrasive grain precursor material. Generally, about 15 ml or more of liquid carrier with the metal oxide precursor dissolved therein is mixed with each 100 grams of abrasive grain precursor material. The preferred volume of liquid carrier with the metal oxide precursor dissolved therein is dependent on the pore volume of the abrasive grain precursor material. The preferred ratio of liquid carrier with the metal oxide precursor dissolved therein per 100 grams of abrasive grain precursor material is typically within a 15 to 70 ml per 100 gram range. Preferably, all of the dissolved oxide precursor impregnates the abrasive grain precursor material (i.e., excess solution is preferably avoided).

In general, when this method is utilized to incorporate modifier precursor into the grits, the modifier is preferentially portioned toward outer parts of the abrasive grain. A more uniform distribution can, in many instances, be obtained by mixing the nonsoluble modifier or modifier precursor into the initially formed dispersion.

Impregnation can be conducted directly on the dried grits from the dispersion, after crushing, for example, if the liquid medium utilized is one which will not dissolve or soften the grit material. For example, if the liquid medium used for the dispersion is water, a non-polar organic solvent can be used as the liquid medium for the impregnating solution for the impregnation of dried grits. Alternatively, especially if the grit material is calcined prior to the impregnation step, water can be, and preferably, is used as the carrier.

For further details regarding impregnation of the porous abrasive grain precursor, see U.S. Pat. No. 5,164,348 (Wood), the disclosure of which is incorporated herein by reference.

It is also within the scope of this invention to incorporate inorganic particles in the impregnation solution to provide an impregnation dispersion. Such inorganic particles are less than about 20 micrometers in size, typically less than about 10 micrometers, preferably less than about 5 micrometers, and may be less than about 1 micrometer. During impregnation, inorganic particles that are too large to penetrate into the pores of the calcined abrasive grain precursor remain on the surface of the abrasive grain precursor.

During sintering, these inorganic particles autogeneously bond to the surface of the abrasive grain providing an increased surface area. This procedure and the resulting coating are further described in U.S. Pat. No. 5,213,951 (Celikkaya et al.), incorporated herein by reference.

Another method to create a surface coating on abrasive grain according to the present invention is to bring inorganic protuberance masses (typically less than about 25 micrometers in size) in contact with the larger dried abrasive grain precursor particles or calcined abrasive grain precursor particles. Then during sintering, the small inorganic protuberance masses autogenously bond to the surface of the abrasive grain. This process and the resulting abrasive grain are further described in U.S. Pat. No. 5,011,508 (Wald et al.), the disclosure of which is incorporated herein by reference.

Calcining

Typically, the deliquified material is calcined prior to sintering. During calcining, essentially all of the volatiles and organic additives are removed from the precursor by heating to a temperature in the range from about 400° C. to about 1200° C. (preferably, about 600° C. to about 1100° C.). Material is held within this temperature range until the free water and preferably 90 wt-% of any bound volatiles are removed. Calcining can be conducted before optional impregnation steps, after optional impregnation steps, or both. In general, preferred processing involves calcining immediately prior to or as a last step before sintering.

Sintering of the Abrasive Grain Precursor

The material including the various oxides and any other modifier comprises the abrasive grain precursor. Upon sintering, the abrasive grain precursor forms a ceramic abrasive grain.

Sintering of the grains may be accomplished through a variety of conventional processes. Typically, sintering is preferably conducted in a rotary kiln at a temperature in the range from between about 1200° C. to 1600.0° C. for a time sufficient to complete conversion to the sintered ceramic abrasive grain. Although the length of time to which the materials should be exposed to sintering temperatures varies depending on factors such as the composition of the ceramic precursor and sintering temperature, generally sintering can be and should be accomplished within a few seconds to about 120 minutes. Shorter sintering times and lower sintering temperatures generally are preferred to inhibit excess grain growth and to obtain preferred microstructures. Sintering can be conducted in an oxidizing atmosphere (e.g., air) or a nonoxidizing atmosphere (e.g., argon, nitrogen, or hydrogen/nitrogen). Sintering can also be done in a stationary kiln. Typically, abrasive grain precursor containing chromium materials are preferably sintered in a reducing atmosphere (e.g., hydrogen/nitrogen).

Sintering is conducted under a pressure of no greater than 100.0 atm., preferably less than about 10 atm. Typically, sintering is conducted at about atmospheric pressure (e.g., about 1 atm.).

Figure 4:
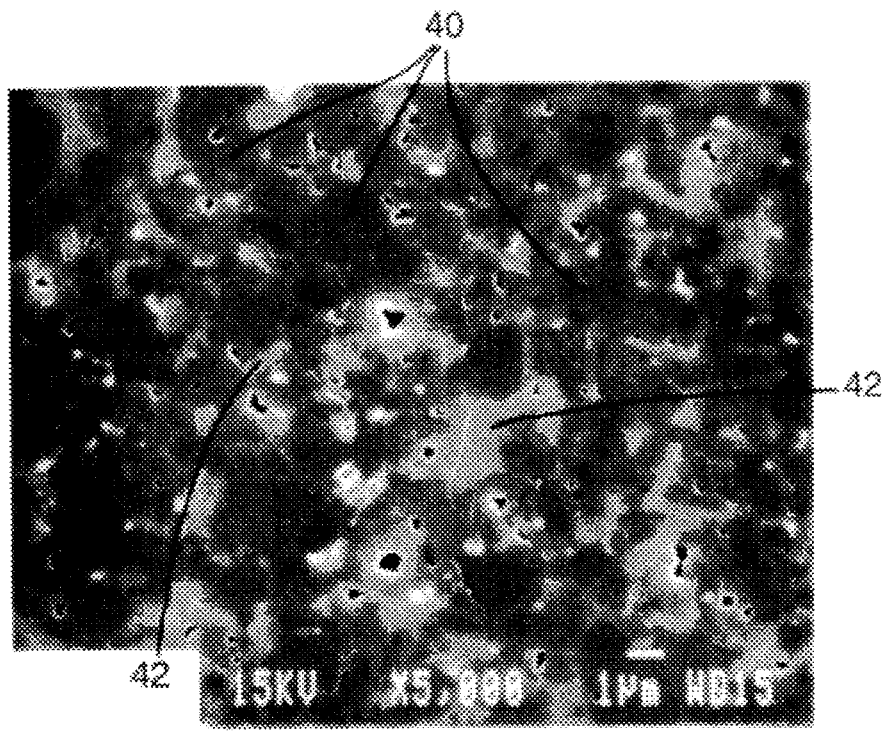
FIGS. 4 and 5 are scanning electron photomicrographs at 5000× of an abrasive grain according to the present invention, the latter photomicrograph being imaged using backscattered electrons.
Figure 5:
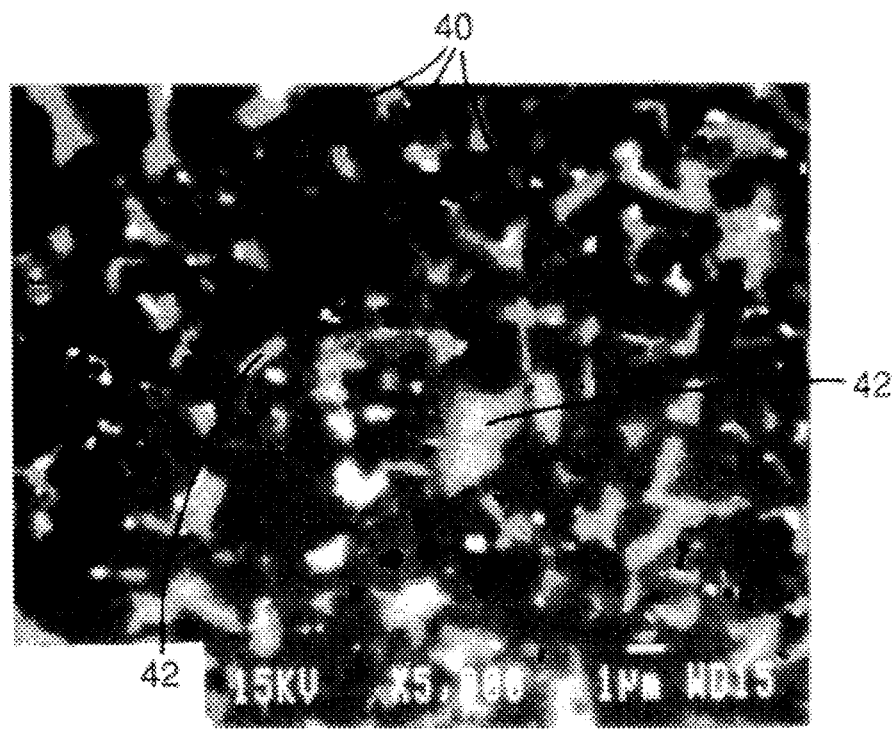

A preferred abrasive grain according to the present invention is shown in the scanning electron microscope (SEM) photomicrographs of FIGS. 4 and 5, the latter having been imaged using backscattered electrons. The SEM sample was prepared by mounting and polishing the abrasive grain as described in the examples under the heading "Hardness." Further, the polished sample was etched for 3 minutes in boiling polyphosphoric acid. Alpha alumina crystallites 40 are randomly oriented with respect to adjacent crystallites. Between some of alpha alumina crystallites 40 are platelets 42. Platelets typically comprise oxides of rare earth metal cations, divalent metal cations, and aluminum cations. The crystal phase of the platelets typically has a magnetoplumbite structure. Platelets 42 appear to be irregularly shaped with a length to width ratio of about 3:1 to 1:1. The thickness of platelets 40 appears to be about 0.1 micrometer. The platelets run the length of several crystallites, some up to 3 micrometers.

Preferably, abrasive grain according to, and made according to, the present invention generally has a porosity less than 10% and a hardness of at least 19 GPa. When reactants for the formation of magnetoplumbites are used, sintering is preferably conducted until the magnetoplumbite platelets are formed. The platelets are typically about 0.1 micrometer thick and about 0.5–3 micrometers long.

Abrasive grain made according to the method of the present invention typically has a particle size ranging from about 0.1 to about 1500 micrometers, usually between about 1 to about 1000 micrometers.

Abrasive grain made according to the method of the present invention can be utilized in an abrasive agglomerate. An abrasive agglomerate comprises single abrasive grains that are bonded together to form a shaped mass. Abrasive agglomerates are further described, for example, in U.S. Pat. No. 4,311,489 (Kressnet), U.S. Pat. No. 4,652,275 (Bloecher et al.), and U.S. Pat. No. 4,799,939 (Bloecher et al.), the disclosures of which are incorporated herein by reference for their teachings of abrasive agglomerates.

Abrasive grain made according to the method of the present invention can be incorporated into abrasive products such as coated abrasives bonded abrasives, nonwoven abrasives and abrasive brushes. Typically, abrasive products or articles comprise a binder and a plurality of abrasive grain secured within the abrasive article by the binder.

Coated abrasives generally comprise a backing, abrasive grain, and at least one binder which holds the abrasive grain to the backing.

An example of a coated abrasive product is provided in FIG. 1 at reference numeral 1. Referring thereto, backing (substrate) 2 has abrasive layer 3 comprising abrasive grain 4 secured to a major surface of backing 2 by make coat 5 and size coat 6. In some instances, a supersize coat, not shown, may be used.

The backing can be cloth, polymeric film, fibre, nonwoven web, paper, combinations thereof, and treated versions thereof. The backing can also be a reinforced thermoplastic backing as described, for example, in U.S. Pat. No. 5,316,812 (Stout et al.), the disclosure of which is incorporated herein by reference. The binder can be an inorganic or organic binder. The abrasive grains can be present in one layer or in two layers of the coated abrasive. Preferred methods of making coated abrasives are described in U.S. Pat. No. 4,734,104 (Broberg) and U.S. Pat. No. 4,737,163 (Larkey), the disclosures of which are incorporated herein by reference.

The coated abrasive backing may have an attachment means on its back surface to secure the resulting coated abrasive to a support pad or back-up pad. This attachment means can be a pressure sensitive adhesive or a loop fabric for a hook and loop attachment. Alternatively, there may be an intermeshing attachment system as described in U.S. Pat. No. 5,201,101 (Rouser et al.), the disclosure of which is incorporated herein by reference.

The back side of the abrasive article may also contain a slip resistant or frictional coating. Examples of such coatings include an inorganic particulate (e.g., calcium carbonate or quartz) dispersed in an adhesive.

Figure 2:
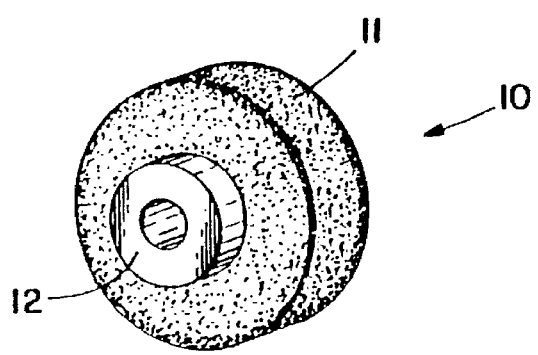
FIG. 2 is a perspective view of a bonded abrasive product incorporating abrasive grain according to the present invention.

Bonded abrasive products are typically comprised of a shaped mass of abrasive grains held together by an organic, metallic, or vitrified binder. The bonded abrasive can be in the form of a wheel, such as a grinding wheel including a cut-off wheel, in the form of a honing stone or other conventional bonded abrasive shapes. The bond abrasive is preferably in the form of a grinding wheel. In FIG. 2, grinding wheel 10 is depicted comprising abrasive grain 11 molded in a wheel and mounted on hub 12. For additional details in the preparation of grinding wheels, see, for example, U.S. Pat. No. 4,997,461 (Markhoff-Matheny), the disclosure of which is incorporated herein by reference. The vitreous binder can be fired at relatively low temperatures (e.g., less than 1100° C.) or relatively higher temperatures (e.g., greater than 1200° C.). The vitreous binder is typically composed of 20% frit to as much as 100% frit, although lower amounts may also be useful.

Figure 3:
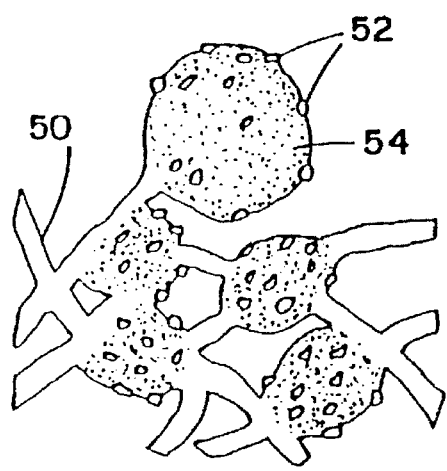
FIG. 3 is an enlarged, fragmentary, schematic view of a nonwoven abrasive product incorporating abrasive grain according to the present invention.

Nonwoven abrasive products typically include an open porous lofty polymer filament structure having abrasive grains of the invention distributed throughout the structure and adherently bonded therein by an organic binder. Examples of filaments include polyester fibers, polyamide fibers, and polyaramid fibers. In FIG. 3, a schematic depiction, enlarged about 100×, of a typical nonwoven abrasive article is provided. The article comprises fibrous mat 50 as a substrate onto which abrasive grain 52 are adhered by binder 54. For additional details in the preparation of nonwoven abrasive products, see, for example, U.S. Pat. No. 2,958,593 (Hoover et al.), the disclosure of which is incorporated herein by reference.

It is also within the scope of this invention to have a surface coating on the abrasive particles. The surface coating may have many different functions.

In some instances, the surface coatings increase adhesion to the binder or alter the abrading characteristics of the abrasive particle. Examples of surface coatings include coupling agents, halide salts, metal oxides including silica, refractory metal nitrides, refractory metal carbides, and the like. Examples of metal oxides include alumina, zirconia, magnesia, yttria, hafnia, ceria, and lanthanum oxide.

The binder for the abrasive article can be a thermosetting organic polymer. There are two main classes of thermosetting resins, condensation curable and addition polymerized resins. Addition polymerized resins can polymerize through a cationic mechanism or a free radical mechanism. Depending upon the energy source that is utilized and the binder precursor chemistry, a curing agent, initiator, or catalyst is sometimes preferred to help initiate the polymerization.

Examples of typical binders include phenolic resins, urea formaldehyde resins, melamine formaldehyde resins, acrylated urethanes, acrylated epoxies, ethylenically unsaturated compounds, aminoplast derivatives having pendant alpha beta unsaturated carbonyl groups, isocyanurate derivatives having at least one pendant acrylate group, isocyanate derivatives having at least one pendant acrylate group, vinyl ethers, epoxy resins, and combinations thereof.

Phenolic resins are widely used in abrasive article binders because of their thermal properties, availability, and cost. There are two types of phenolic resins, resole and novolac. Resole phenolic resins have a molar ratio of formaldehyde to phenol of greater than or equal to one to one, typically between 1.5:1.0 to 3.0:1.0. Novolac resins have a molar ratio of formaldehyde to phenol of less than one to one.

The aminoplast resins have at least one pendant alpha, beta unsaturated carbonyl group per molecule or oligomer. These unsaturated carbonyl groups can be acrylate, methacrylate, or acrylamide type groups. Examples of such materials include N-(hydroxymethyl)acrylamide, N,N'-oxydimethylenebisacrylamide, ortho and para acrylamidomethylated phenol, acrylamidomethylated phenolic novolac, and combinations thereof. These materials are further described in U.S. Pat. No. 4,903,440 (Larson et al.) and U.S. Pat. No. 5,236,472 (Kirk et al.), the disclosures of which are incorporated herein by reference.

The abrasive article and/or abrasive binder slurry can further comprise optional additives, such as, for example, fillers (including grinding aids), fibers, lubricants, wetting agents, thixotropic materials, surfactants, pigments, dyes, antistatic agents, coupling agents, plasticizers, and suspending agents. The amounts of these materials are selected to provide the properties desired.

Examples of useful fillers include metal carbonates (e.g., calcium carbonate (chalk, calcite, marl, travertine, marble and limestone), calcium magnesium carbonate, sodium carbonate, magnesium carbonate), silica (e.g., quartz, glass beads, glass bubbles and glass fibers), silicates (e.g., talc, clays, (montmorillonite) feldspar, mica, calcium silicate, calcium metasilicate, sodium aluminosilicate, sodium silicate), metal sulfates (e.g., calcium sulfate, barium sulfate, sodium sulfate, aluminum sodium sulfate, aluminum sulfate), gypsum, vermiculite, wood flour, aluminum trihydrate, carbon black, metal oxides (e.g., calcium oxide (lime), aluminum oxide, titanium dioxide), and metal sulfites (e.g., calcium sulfite).

The term filler also encompasses materials that are known in the abrasive industry as grinding aids. A grinding aid is defined as particulate material that the addition of which has a significant effect on the chemical and physical processes of abrading which results in improved performance. Examples of chemical groups of grinding aids include waxes, organic halide compounds, halide salts, sulfur and sulfur compounds, and metals and their alloys. The organic halide compounds will typically break down during abrading and release a halogen acid or a gaseous halide compound. Examples of such materials include chlorinated compounds such as tetrachloronaphtalene, pentachloronaphthalene, and polyvinyl chloride. Examples of halide salts include sodium chloride, potassium cryolite, sodium cryolite, ammonium cryolite, potassium tetrafluoroboate, sodium tetrafluoroborate, silicon fluorides, potassium chloride, and magnesium chloride. Examples of metals include tin, lead, bismuth, cobalt, antimony, cadmium, iron, and titanium. Other miscellaneous grinding aids include sulfur, organic sulfur compounds, graphite and metallic sulfides.

Examples of antistatic agents include graphite, carbon black, vanadium oxide, and humectants. These antistatic agents are disclosed in U.S. Pat. No. 5,061,294 (Harmer et al.), U.S. Pat. No. 5,137,542 (Buchanan et al.), and U.S. Pat. No. 5,203,884 (Buchanan et al.), the disclosures of which are incorporated herein by reference.

A coupling agent can provide an association bridge between the binder precursor and the filler particles or abrasive grain. Examples of coupling agents include silanes, titanates, and zircoaluminates.

The abrasive articles described above can contain 100% of the abrasive grain of the invention. Additionally, the abrasive articles may contain a blend of the abrasive grains of the invention with conventional abrasive grains or diluent grains. It is preferred that the abrasive particles have a Mohs' hardness of at least about 8, more preferably above 9. Examples of such abrasive particles include fused aluminum oxide (which includes brown aluminum oxide, heat treated aluminum oxide, and white aluminum oxide), ceramic aluminum oxide made by a sol gel process, green silicon carbide, silicon carbide, chromia, alumina zirconia, diamond, ceria, cubic boron nitride, boron carbide, garnet, titanium diboride, titanium carbide, and combinations thereof. Abrasive grain according to the present invention can also be blended with diluent grains (e.g., marble, gypsum, limestone, flint, silica, glass bubbles, glass beads, iron oxide, aluminum silicate, and glass). Abrasive grain according to the present invention can also be combined with abrasive agglomerates. An example of an abrasive agglomerate is described in U.S. Pat. No. 4,652,275 (Bloecher et al.), the disclosure of which is incorporated herein by reference. However, at least 15% by weight, and preferably 50 to 100% by weight, of the grains of the abrasive product should be of the type described herein.

Objects and advantages of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

The following abbreviations and trade names are used throughout:

ASB alpha alumina monohydrate (boehmite) powder commercially available under the trade designation "DISPERAL" from Condea of Germany;

IO1 iron oxide hydroxide, FeOOH, dispersion in water, 7% iron oxide (calculated on a theoretical oxide basis as $Fe_2O_3$) about 90–95% of which is lepidocrocite (average particle size of about 0.05 to 0.1 micrometer; length to diameter or width ratio of about 1:1 to 2:1);

IO2 iron oxide hydroxide, FeOOH, dispersion in water, 4.7% iron oxide (calculated on a theoretical oxide basis as $Fe_2O_3$) about 90–95% of which is lepidocrocite (average particle size of about 0.05 to 0.1 micrometer; length to diameter or width ratio of about 1:1 to 2:1);

IO3 iron oxide hydroxide, FeOOH, dispersion in water, 4.2% iron oxide (calculated on a theoretical oxide basis as $Fe_2O_3$) about 90–95% of which is lepidocrocite (average particle size of about 0.05 to 0.1 micrometer; length to diameter or width ratio of about 1:1 to 2:1);

IO4 iron oxide hydroxide, FeOOH, dispersion in water, 3.3% iron oxide (calculated on a theoretical oxide basis as $Fe_2O_3$) about 90–95% of which is lepidocrocite (average particle size of about 0.05 to 0.1 micrometer; length to diameter or width ratio of about 1:1 to 2:1);

IO5 iron oxide hydroxide, FeOOH, dispersion in water, 3% iron oxide (calculated on a theoretical oxide basis as $Fe_2O_3$) about 90–95% of which is lepidocrocite (average particle size of about 0.05 to 0.1 micrometer; length to diameter or width ratio of about 1:1 to 2:1);

AS1 alpha alumina (commercially available under the trade designation "39 SG ALUMALUX" from Alcoa Co., Bauxite, Ariz.);

AS2 alpha alumina (commercially available under the trade designation "AKP-50" from Sumitomo Chemical of Japan; 99.995% by weight alpha alumina; impurity content: 9 ppm Si, 4 ppm Na, 3 ppm Mg, >1 ppm Ca, and 19 ppm Fe; surface area: 11 $m^2/g$; and mean particle size: 0.2 micrometer);

AS3 chi alumina obtained by heating a trihydrate alumina (gibbsite) (commercially available under the trade designation "CV-3503" from Alcoa Co.) at 500° C. for about 14 hours in a stationary oven;

AS4 chi alumina obtained by heating a trihydrate alumina (gibbsite) (commercially available under the trade designation "C-331" from Alcoa Co.) at 600° C. for about 14 hours in a stationary oven;

AS5 chi alumina (commercially available under the trade designation "AA100W" from Alcan Corp. of Cleveland, Ohio);

AS6 gamma alumina from a prefired alumina sol gel process, preparation method described below;

AS7 alpha alumina (commercially available under the trade designation "A16 SG" from Alcoa Co.);

AS8 alpha alumina (commercially available under the trade designation "A16" from Alcoa Co.);

AS9 chi alumina obtained by heating a trihydrate alumina (gibbsite) (commercially available under the trade designation "HYDRAL PGA" from Alcoa Co.) at 600° C. for about 14 hours in a stationary oven;

AS10 gamma alumina (surface area of 150 m$^2$/g; commercially available under the trade designation "V-GH" from LaRoche Chemical of Baton Rouge, La.);

AS11 gamma alumina (surface area of 284 m$^2$/g; commercially available under the trade designation "V-GL" from LaRoche Chemical);

AS12 gamma alumina (surface area of 300 m$^2$/g; commercially available under the trade designation "V-GH" from LaRoche Chemical);

AS13 alpha alumina powder (commercially available under the trade designation "ERC-DBM" from Reynolds Metals Co. of Bauxite, Ak.);

DHO deionized water;

ZRS zirconia sol, commercially available under the trade designation "NYACOL ZIRCONIA" from Nyacol of Ashland, Mass.; 20% concentration in DHO; 100 nm, Lot II 3614);

AFA aluminum formo-acetate solution (9 percent by weight calculated on a theoretical oxide basis as Al$_2$O$_3$) prepared by digesting aluminum powder in an acetic acid-formic acid solution under reflux conditions as described in Example 3 of U.S. Pat. No. 5,185,299, the disclosure of which is incorporated herein by reference, wherein the ratio of Al to carboxylate was 1:1. aluminum formoacetate;

citric citric acid monohydrate, 100% concentration;

nitric nitric acid, HNO$_3$, 70% concentration;

EXR synthetic ion exchange resin, commercially available under the trade designation "DOWEX HCR-W2-H" from Dow Chemical Co. of Midland, Mich.;

MGN magnesium nitrate solution (11% Mg(NO$_3$)$_3$.6H$_2$O; available from Mallinckrodt Chemical of Paris, Ky.); and REO solution prepared by blending a lanthanum, neodymium, and yttrium nitrate solution (20.5% La(NO$_3$)$_3$.6H$_2$O, 20.1% Nd(NO$_3$)$_3$.6H$_2$O, 26.1% Y(NO$_3$)$_3$.6H$_2$O; available from Molycorp of Lourviers, Colo.) with a sufficient amount of MGN and cobalt nitrate (15% Co(NO$_3$)$_2$.6H$_2$O; available from Hall Chemical of Wickliffe, Ohio) to provide a solution containing about 5.8% La(NO$_3$)$_3$.6H$_2$O, about 5.8% Nd(NO$_3$)$_3$.6H$_2$O, about 7.1% Y(NO$_3$)$_3$.6H$_2$O, about 14.4% Mg(NO$_3$)$_2$.6H$_2$O, about 0.4% Co(NO$_3$)$_2$.6H$_2$O, and the balance deionized water.

Preparation Procedure for AS6

The following were dispersed together using a high shear mixer: 69.8 parts of about 60° C. DHO, 2.3 parts nitric, and 28.5 parts ASB. The resulting sol was dried over a 24 hour period starting at about 100° C. and increasing the temperature to about 180° C. After drying, the sol was a friable solid that was then crushed using conventional hammermill and roll crushing equipment, and then screened. The screened particles passed through a screen containing 1 mm openings but were retained on a screen containing 0.125 mm openings. The screened particles were calcined in a rotary kiln that was about 15 cm in diameter, about 1.1 m long, had a hot zone of about 650° C., and had a residence time of about 1 minute, to substantially remove the bound volatiles. The elevation of the silicon carbide tube was about a 2.5° inclination.

General Grain Preparation Procedure

For the Examples, the listed ingredients were placed in an 8.8 liter ball mill jar (high alumina porcelain mill; available from Norton Co. of Worchester, Mass.) and dispersed for the noted time. The mill jar contained about 9000 g of 6.35 mm alumina rod milling media (commercially available from Coors Ceramic of Golden, Colo., under the Stock No. #74549). This was the dispersion procedure used unless noted in the specific Example. Each Example will note the dispersion technique and the milling time. After milling, the slurry was poured into either an aluminum, plaster, or pyrex tray and dried several hours or overnight at about 100° C. The dried slurry was crushed with a pulverizer having two opposed plates, one spinning, one static (commercially available under the trade designation "BRAUN PULVERIZER TYPE VA-53" from Braun Corp. of Los Angeles, Calif.). The resulting grits were calcined in a rotary kiln that was about 15 cm in diameter, about 1.1 cm long, had a hot zone of about 650° C., and had a residence time of about 2–3 minutes. The elevation of the silicon carbide tube was about a 2.5° inclination. The calcining temperature is given in the description below for each Example.

If the starting material was AS1, AS2, AS7, and AS8, the material was further calcined in a rotary kiln having a 8.9 cm (3.5 inch) diameter, 137 cm (54 inch) long silicon carbide tube, with a hot zone of about 30.5 cm (12 inches), at about 1100° C. The residence time was about 5 minutes. The elevation of the silicon carbide tube was about a 2.5° inclination.

For some Examples, the calcined grits were impregnated with the REO impregnation solution. Unless otherwise stated, impregnation was conducted by mixing 60 ml of impregnation solution per 100 grams of calcined material. After impregnation, the grits were again calcined in a rotary kiln, usually at the same temperature as the first calcining step.

After calcining, the grits were sintered according to Sintering Procedure 1, 2, or 3. The sintering procedure, time, and temperature are given below in the description of each example.

Sintering Procedure 1

For Sintering Procedure 1, about 10–15 grams of calcined particles were placed in a platinum crucible, which in turn was placed into a conventional box furnace at temperature.

Sintering Procedure 2

For Sintering Procedure 2, the calcined particles were placed in a rotating kiln having a 8.9 cm (3.5 inch) diameter, 137 cm (54 inch) long silicon carbide tube, and a hot zone of about 30.5 cm (12 inches). The elevation of the silicon carbide tube was about a 2.5° inclination. Unless otherwise noted, the rotation of the kiln was about 3 rpm, which corresponds to a residence time of about 30–40 minutes.

Sintering Procedure 3

For Sintering Procedure 3, about 10–15 grams of calcined particles were placed in a platinum crucible which in turn was placed into a cold conventional box furnace. The furnace temperature was then raised to the sintering temperature.

General Disc Preparation Procedure

The following general procedure described how the coated abrasive fibre discs were made for testing. A make resin was coated onto a 0.8 mm thick vulcanized fibre disc about 17.8 cm in diameter with a 2.2 cm center hole. The make resin comprised by weight 48% resole phenolic resin and 52% calcium carbonate and was diluted to 81% solids with water and glycol ether solvent. The wet make resin weight was 150 g/m$^2$. Immediately after the make coat was applied, the abrasive grains, grade 36, were electrostatically coated. The resulting construction was heated at 77° C. for 15 minutes, and then at 93° C. for 90 minutes to partially cure the make resin. A size resin was then coated over the abrasive grains/make coat with an average weight of about 670 g/m². The size resin was diluted to 78% solids with water and glycol ether solvent and consisted of 32% resole phenolic resin and 68% cryolite. The size resin was cured at 77° C. for one hour and then at 102° C. for 16 hours. The fibre discs were flexed prior to testing.

Density

Unless stated otherwise, a helium stereopycnometer (commercially available under the trade description "ACCUPYC 1330" from Micromeritics Corp. of Norcross, Ga.) was used to determine the density of the abrasive grain. The results are reported in grams per cubic centimeter (g/cm³).

Hardness

The hardness of the ceramic grain was measured by Vickers indentation using a 500 g load. The values are reported in GPa (gigaPascals).

Specifically, abrasive grain were mounted in a conventional molding compound (commercially available under the trade designation "EPOMET" from Buehler, Ltd. of Evanston, Ill.) in 2.5 cm (1 inch) diameter stainless steel mold rams. The grains and the molding compound were then pressed at 27.6 MPa (4000 psi) and simultaneously heated to about 150° C. in a conventional mounting press (commercially available under the trade designation "BUEHLER PNEUMET I MOUNTING PRESS" from Buehler, Ltd.). The molding compound was then cured by holding it at about 150° C. for about 5 minutes. The cured molding compound was then cooled to room temperature.

The mounted abrasive grains were then polished using a polishing unit (commercially available under the trade designation "DIALOG" from Buehler, Ltd.) having a microprocessor control that dispenses abrasive slurries to the polishing area (commercially available under the trade designation "METLAP I" from Buehler, Ltd.). The polishing was done in the following successive stages:

Stage 1

Polishing surface: alumina platen, 20.3 cm diameter (commercially available under the trade designation "METLAP 10" from Buehler, Ltd.)

Abrasive Type & Size: 30 micrometer diamond slurry (commercially available under the trade designation "METADI DIAMOND SLURRY" from Buehler, Ltd.)

Polishing Time: 3 minutes, or until the surface is flat

Force: 22.2N/sample (5 pounds/sample)

Speed setting: 240 rpm

Dispensing sequence: 1 second spray on; 10 spray off

Relative rotation: clockwise

Stage 2

Polishing surface: polishing cloth (commercially available under the trade designation "TEXMET POLISHING CLOTH" from Buehler, Ltd.) clamped on a 20.3 diameter aluminum platen (commercially available under the trade designation "METLAP" from Buehler, Ltd.)

Abrasive Type & Size: 6 micrometer diamond slurry (commercially available under the trade designation "METADI DIAMOND SLURRY" from Buehler, Ltd.)

Polishing Time: 10 minutes

Force: 22.2N/sample (5 pounds/sample)

Speed setting: 120 rpm

Dispensing sequence: 1 second spray on; 10 spray off

Relative rotation: counterclockwise

Stage 3

Polishing surface: polishing cloth ("TEXMET POLISHING CLOTH") clamped on a 20.3 diameter aluminum platen ("METLAP")

Abrasive Type & Size: 1 micrometer diamond slurry (commercially available under the trade designation "METADI DIAMOND SLURRY" from Buehler, Ltd.)

Polishing Time: 30 minutes

Force: 22.2N/sample (5 pounds/sample)

Speed setting: 120 rpm

Dispensing sequence: 1 second spray on; 10 seconds spray off

Relative rotation: clockwise

The Vickers microhardness of the abrasive grain were measured using a conventional microhardness tester with a diamond indenter (commercially available under the trade designation "MINILOAD 2 MICROHARDNESS TESTER" from Leitz of Germany). The indenter (a highly polished pointed square pyramidal diamond with a face angle of 136 degrees) was brought into contact gradually and smoothly with the sample to be measured. The predetermined load was 500 grams. The reported hardness values are an average of 5 measurements.

Grinding Performance Test Procedure 1

Test Procedure 1 was designed to measure the cut rate of the mineral and the amount of metal removed in 12 minutes. The coated abrasive disc was mounted on a beveled aluminum back-up pad, and used to grind the face of a 1.25 cm by 18 cm 1018 mild steel workpiece. The disc was driven at 5,500 rpm while the portion of the disc overlaying the beveled edge of the back-up pad contacted the workpiece at about a 6 kg load. Each disc was used to grind a separate workpiece for a one minute interval for a total time of 12 minutes. The initial cut was the amount of metal removed in the first minute of grinding. Likewise the final cut was the amount of metal removed in the last minute of grinding and the total cut was the summation of the amount removed throughout the test. In most of the examples, the performance of the abrasive grain was stated as percent of control, that is, the total amount of metal removed for the control example was equated to 100% and the abrasive grain of the example was measured relative to the 100%.

Grinding Performance Test Procedure 2

Test Procedure 2 was the same as Test Procedure 1 except that the workpiece used was 304 stainless steel.

Comparative Examples A–J and L–M

The raw materials used for making the slurries for Comparative Examples A–I are shown in Table 1, below. These Comparative Examples all contain ASB (i.e., boehmite).

TABLE 1

| Comp. Ex. | ASB, g | AS1, g | AS2, g | Nitric, g | Citric, g | DHO, g | IO1, g | Mill time, hrs. |
|---|---|---|---|---|---|---|---|---|
| A | 2 | 200 | — | 5 | — | 60 | 29 | shaken |
| B, C | 10 | — | 1000 | 27 | — | 850 | — | 6 |
| D, E | 10 | — | 1000 | 20 | 20 | 1200 | 150 | 6 |
| F | 10 | — | 1000 | 20 | — | 1000 | — | 12 |
| G, H, I | 50 | — | 1000 | 20 | — | 1000 | — | 12 |

One batch of material was used for Comparative Examples B and C (i.e., one half of the batch was used for Comparative Example B and the other for Comparative Example C). One batch of material was used for Comparative Examples G, H, and I.

The calcining, impregnation, and sintering information for Comparative Examples A–I is provided in Table 2, below.

TABLE 2

| Comp. Ex. | Calcining temp., °C. | REO impregnation | After impregnation, calcining temp., °C. | Sintering procedure | Sintering temp., °C. | Sintering time, min. |
|---|---|---|---|---|---|---|
| A | 1200 | no | — | 3 | 1550 | 90 |
| B | 1000 | no | — | 3 | 1550 | 60 |
| C* | 1000 | yes | 1000 | 3 | 1550 | 60 |
| D | 1000 | yes | 1000 | 1 | 1500 | 30 |
| E | 1000 | yes | 500 | 1 | 1550 | 35 |
| F | 1000 | yes | 500 | 1 | 1550 | 35 |
| G | 1000 | no | — | 1 | 1550 | 35 |
| H | 1000 | yes | 1000 | 1 | 1550 | 35 |
| I | 1000 | yes** | 1000 | 1 | 1550 | 35 |

*Impregnation conducted by fully saturating calcined material: excess impregnation solution was decanted away.
**4.0 grams of zirconyl nitrate solution (21% $ZrO_2$ equivalent) were added to the 202 grams of REO solution used.

The alpha alumina-based grain for Comparative Example J contained about 1% $Fe_2O_3$, 4.5% MgO, and 94.5% $Al_2O_3$ (calculated on a theoretical oxide basis) and was made according to U.S. Pat. No. 4,744,802 (Schwabel) and U.S. Pat. No. 4,964,883 (Morris et al.).

The grain for Comparative Example L was commercially available from the 3M Company of St. Paul, Minn., under the trade designation "321 CUBITRON."

The density and hardness values of the abrasive grain of Comparative Examples A–J and L–M are provided in Table 3, below.

The alpha alumina-based grain for Comparative Example M contained about 1% $Fe_2O_3$, 4.5% MgO, and 94.5% $Al_2O_3$ (calculated on a theoretical oxide basis), had an alpha alumina surface coating, and was made according to U.S. Pat. No. 4,744,802 (Schwabel), U.S. Pat. No. 4,964,883 (Morris et al.), and U.S. Pat. No. 5,011,508 (Wald et al.).

TABLE 3

| Comp. Ex. | Density, g/cm³ | Hardness, GPa |
|---|---|---|
| A | 3.84 | 17.8 |
| B | 3.87 | |
| C | 3.96 | |
| D | 3.93 | |
| E | 3.96 | |
| F | 3.91 | 21.4 |
| G | 3.90 | |
| H | 3.95 | |
| I | 3.97 | |
| J | 3.81 | 19 |
| L | 3.90 | 22 |
| M | 3.88 | 21–22 |

EXAMPLES 1–6

The raw materials used for making the slurries for Examples 1–6 are shown in Table 4, below.

TABLE 4

| Ex. | AS2, g | nitric, g | citric, g | DHO, g | Sintering aid; amount, g | Milling time, hrs. |
|---|---|---|---|---|---|---|
| 1 | 1000 | — | 26 | 1250 | IO1; 150 | 12 |
| 2 | 1000 | 20 | 20 | 1000 | IO1; 150 | 12 |
| 3 | 1000 | 20 | 20 | 1065 | IO1; 220 | 12 |
| 4 | 573 | 11 | 11 | 910 | IO2; 126 | 2 |
| 5 | 1000 | 30 | 20 | 1200 | IO2; 212 | 16 |
| 6 | 800 | 24 | 16 | 960 | IO2; 170 | 16 |

The calcining, impregnation, and sintering information for Examples 1–6 is given in Table 5, below.

TABLE 5

| Ex. | Calcining temp., °C. | REO impregnate | After impregnation, calcining temp., °C. | Sintering procedure | Sintering temp., °C. | Sintering time, min. |
|---|---|---|---|---|---|---|
| 1 | 800 | yes | 800 | 3 | 1550 | 60 |
| 2 | 1000 | yes | 1000 | 1 | 1550 | 60 |
| 3 | 1000 | yes | 1000 | 3 | 1550 | 30 |
| 4 | 1000 | yes | 1000 | 3 | 1550 | 30 |
| 5 | 1000 | yes | 1000 | 3 | 1550 | 30 |
| 6 | 1000 | yes | 1000 | 3 | 1550 | 30 |

The densities and hardnesses values for the abrasive grain of Examples 1–5 are given in Table 6, below.

TABLE 6

| Ex. | Density, g/cm³ | Hardness, GPa |
|---|---|---|
| 1 | 3.99 | |
| 2 | 3.97 | 21.8 |
| 3 | 3.97 | |
| 4 | 3.98 | |
| 5 | 3.99 | |

The density and grinding performance data for the abrasive grain of Example 2 and Comparative Examples D, E, and J are provided in Table 7, below.

TABLE 7

| Ex. | Density, g/cm³ | Grinding performance, (Test proc. 1), % of Comp. J |
|---|---|---|
| 2 | 3.97 | 123 |
| Comp. D | 3.93 | 106 |
| Comp. E | 3.96 | 112 |
| Comp. J | 3.81 | 100 |

The grinding performance of Examples 5 and 6 and Comparative Example D is provided in Table 8, below.

TABLE 8

| Ex. | Grinding performance (Test proc. 1), of Comp. D | Grinding performance (Test proc. 2), of Comp. D |
|---|---|---|
| 5 | 102 | 58 |
| 6 | 107 | 42 |
| Comp. D | 100 | 100 |

EXAMPLES 7–11

Examples 7–11 compared different milling times and zirconia additive to the slurry. The raw materials used for making the slurries for Examples 7–11 are listed in Table 9, below.

TABLE 9

| Ex. | AS7, g | Nitric, g | Citric, g | DHO, g | Sintering aid; amount, g | ZRS, g | Milling time, hrs. |
|---|---|---|---|---|---|---|---|
| 7 | 900 | 27 | 18 | 1080 | IO2; 191 | 0 | 16 |
| 8 | 1000 | 29 | 10 | 1200 | IO3; 214 | 230 | 72 |
| 9 | 1000 | 29 | 20 | 1200 | IO3; 214 | 230 | 16 |
| 10 | 1000 | 30 | 20 | 1200 | IO3; 212 | 0 | 3 |
| 11 | 1000 | 29 | 20 | 1200 | IO3; 214 | 230 | 48 |

The calcining, impregnation, and sintering information for Examples 7–11 is provided in Table 10, below.

TABLE 10

| Ex. | Calcining temp., °C. | REO impreg. | After impregnation, calcining temp., °C. | Sintering procedure | Sintering temp., °C. | Sintering time, min. |
|---|---|---|---|---|---|---|
| 7 | 1000 | yes | 1000 | 3 | 1500 | 60 |
| 8 | 1000 | yes | 1000 | 2 | 1450 | |
| 9 | 1000 | yes | 1000 | 2 | 1400 | |
| 10 | 1000 | yes | 1000 | 3 | 1550 | 60 and |
| | | | | 3 | 1550 | 30 |
| 11 | 1000 | yes | 1000 | 3 | 1550 | 30 |

The density values of the abrasive grain of Examples 7–10 are given in Table 11, below.

TABLE 11

| Ex. | Density, g/cm³ |
|---|---|
| 7 | 3.85 |
| 8 | 3.81 |
| 9 | 3.87 |
| 10 | 3.86 |

The grinding performance of the abrasive grain of Examples 7–11 and Comparative Example L is provided in Table 12, below.

TABLE 13

| Ex. | Milling time, hrs. | $Fe_2O_3$*, % | MgO,* % | $Y_2O_3$*, % | $Nd_2O_3$*, % | $La_2O_3$*, % |
|---|---|---|---|---|---|---|
| 12 | 72 | — | 1.2 | 1.2 | 1.2 | 1.2 |
| 13 | 70 | 3 | — | — | — | 4 |
| 14 | 48 | 3 | — | — | — | 4 |
| 15 | 48 | 4 | — | — | — | 4 |
| 16 | 70 | 4 | — | — | — | 4 |
| 17 | 72 | 1 | 1.2 | 1.2 | 1.2 | 1.2 |
| 18 | 72 | 3 | — | — | — | 4 |
| 19 | 72 | 3 | — | — | — | 4 |

*The %'s are reported on a theoretical oxide basis, and are excess weight percents based on the $Al_2O_3$ content of the sintered abrasive grain.

TABLE 12

| Ex. | Grinding performance (Test proc. 1), of Comp. L |
|---|---|
| 7 | 105 |
| 8 | 112 |
| 9 | 113 |
| 10 | 132 |
| 11 | 107 |
| Comp. L | 100 |

EXAMPLES 12–19

Examples 12–19 compared different milling times and oxide additives. The slurries were prepared according to the procedure used for Example 10 except for the milling times which are listed in Table 13, below. The calcine temperature was 1100° C. For Examples 15, 16, and 17, a sufficient amount of IO3 was added to the respective slurries to provide the iron oxide levels reported in Table 13, below. For Example 18, a sufficient amount of iron oxide (available from Pfizer Pigments, Inc., of New York, N.Y., under the trade designation "KRONA RED IRON OXIDE, C.I. PIGMENT RED 100") to provide the level of iron oxide reported in Table 13, below. Further, the slurry for Example 19 included a sufficient amount of iron nitrate solution (10.5% $Fe(NO_3)_3.9H_2O$; available from Shepard Chemical of Cincinnati, Ohio), and a sufficient amount of lanthanum nitrate solution (28% $La(NO_3)_3.6H_2O$; available from Molycorp) to provide the iron oxide and lanthanum oxide levels reported in Table 13, below.

The preparation of Examples 12–18 each included the following impregnation steps. The calcined material of Examples 12 and 17 was impregnated with REO.

For Examples 13 and 14, there were two separate impregnation steps. For one impregnation, a sufficient amount of DHO was added per 38 grams of ferric nitrate solution (10.5% $Fe(NO_3)_3.9H_2O$; available from Shepard Chemical) to provide 33 ml of solution. Impregnation was conducted at a ratio of 33 ml of the latter solution per 100 grams of calcined material. For the other impregnation, a sufficient amount of DHO was added per 14 grams of lanthanum nitrate solution (28% $La(NO_3)_3.6H_2O$; available from Molycorp) to provide 33 ml of solution. For this impregnation, a ratio of 33 ml of the latter solution per 100 grams of calcined material was used.

For Examples 13–16 and 18, the impregnation solution was lanthanum nitrate (28% $La(NO_3)_3.6H_2O$; available from Molycorp).

After each impregnation, the material was calcined at 650° C. Each Example was sintered at using sintering Procedure No. 2.

The density and grinding performance data for the abrasive grain of Examples 12–19 and Comparative Example L is provided in Table 14, below.

TABLE 14

| Ex. | Density, g/cm³ | Grinding performance (Test proc. 1). % of Comp. L |
|---|---|---|
| 12 | 3.82 | 98 |
| 13 | 3.88 | 60 |
| 14 | 3.89 | 50 |
| 15 | 3.86 | 66 |
| 16 | 3.83 | 60 |
| 17 | 3.89 | 108 |
| 18 | 3.80 | 47 |
| 19 | 3.84 | 28 |
| Comp. L | 3.88 | 100 |

EXAMPLES 20–25

Examples 20–25 show different processing temperatures and times. The raw materials for the respective slurries listed below in Table 15 (below) were milled about 72 hours. The slurries were the same except for Examples 21–24 which had AFA added. One batch of material was used for Examples 21 and 22, and another for Examples 23 and 24.

TABLE 15

| Ex. | ASB, g | Nitric, g | Citric, g | DHO, g | IO1, g | AFA, g | Milling time, hrs. |
|---|---|---|---|---|---|---|---|
| 20 | 1300 | 19.5 | 26 | 1837 | 13 | — | 72 |
| 21–24 | 1300 | 19.5 | 26 | 1837 | 13 | 86 | 73 |
| 25 | 1300 | 19.5 | 26 | 1837 | 13 | — | 72 |

For Example 20, the slurry was deaired and cast on a plaster mold to partially dewater it so that it resembled a thick mud. The slurry was then processed into triangles as disclosed in U.S. Pat. No. 5,201,916 (Berg et al.), the disclosure of which is incorporated herein by reference. The shaped particles were calcined at 700° C., after which then were impregnated with REO and then again calcined. The triangles were sintered by raising temperatures to 1100° C. in 25 minutes, then sustained for 20 minutes, after which heating to 1510° C. in 15 minutes and sustaining for 90 minutes.

The calcining, impregnation, and sintering information for Examples 21–25 is provided in Table 16, below.

TABLE 16

| Ex. | Calcining temp., °C. | Impregnate | Calcining temp., °C. | Sintering procedure | Sintering temp., °C. | Sintering time, min. |
|---|---|---|---|---|---|---|
| 21 | 1000 | REO | 700 | 1 | 1500 | 50 |
| 22 | 1000 | REO | 700 | 1 | 1480 | 60 |
| 23 | 1000 | REO | 700 | 1 | 1480 | 120 |
| 24 | 1000 | REO | 700 | 1 | 1500 | 50 |
| 25 | 1100 | REO | 700 | 1 | 1480 | 120 |

The density values of the abrasive grain for Examples 20–25 are provided in Table 17, below.

TABLE 17

| Ex. | Density, g/cm³ |
|---|---|
| 20 | 3.96 |
| 21 | 3.91 |
| 22 | 3.85 |
| 23 | 3.92 |
| 24 | 3.90 |
| 25 | 3.91 |

EXAMPLES 26–28

The slurries for Examples 26–28 were made with 1040 parts AS8, 20.8 parts citric, 20.8 parts nitric, 10.4 parts IO1, and 1470 parts DHO, and were milled for 72 hours. After drying and crushing, the grits were calcined at 1100° C. The calcined grits were then impregnated with metal nitrate salt solutions to produce the percentages listed in Table 18 (below), and then calcined again. The grits were sintered for 120 minutes according to Procedure 1 at the temperature stated in Table 18, below.

TABLE 18

| Ex. | MgO*, % | Y₂O₃*, % | Nd₂O₃*, % | La₂O₃*, % | Sintering temp., °C. |
|---|---|---|---|---|---|
| 26 | 1 | 1 | 1 | 1 | 1470 |
| 27 | 1 | 1 | 2 | 2 | 1460 |
| 28 | 1 | 2 | 1 | 1 | 1450 |

*Percentages are on a theoretical oxide basis.

The metal salt solution for Example 26 was REO. The metal salt solution for Example 27 was prepared by blending lanthanum, neodymium, and yttrium nitrate solutions (20.5% La(NO₃)₃.6H₂O, 20.1% Nd(NO₃)₃.6H₂O, 26.1% Y(NO₃)₃.6H₂O, respectively; each available from Molycorp) with a sufficient amount of MGN, and deionized water, to provide a solution containing about 12% La(NO₃)₃.6H₂O, about 12% Nd(NO₃)₃.6H₂O, about 8% Y(NO₃)

$_3 \cdot 6H_2O$, about 15% $Mg(NO_3)_2 \cdot 6H_2O$, and the balance deionized water. The metal salt solution for Example 28 was prepared by blending lanthanum, neodymium, and yttrium nitrate solutions (20.5% $La(NO_3)_3 \cdot 6H_2O$, 20.1% $Nd(NO_3)_3 \cdot 6H_2O$, 26.1% $Y(NO_3)_3 \cdot 6H_2O$, respectively; each available from Molycorp) with a sufficient amount of MGN, and deionized water, to provide a solution containing about 6% $La(NO_3)_3 \cdot 6H_2O$, about 6% $Nd(NO_3)_3 \cdot 6H_2O$, about 16% $Y(NO_3)_3 \cdot 6H_2O$, about 15% $Mg(NO_3)_2 \cdot 6H_2O$, and the balance deionized water.

The density values of the abrasive grain of Examples 26–28 are given in Table 19, below.

TABLE 19

| Ex. | Density, g/cm$^3$ |
|---|---|
| 26 | 3.94 |
| 27 | 3.94 |
| 28 | 3.89 |

EXAMPLES 29–41

Examples 29–41 used ion exchange resin, EXR, to remove any ion impurities that were in the alumina powder or other raw material. The raw materials used for making the slurries of Examples 29–41 are listed in Table 20, below. Examples 29–31 were milled in a 2 liter urethane lined ball mill jar (commercially available from U.S. Stoneware of Akron, Ohio) which contained about 3450 grams of zirconia milling media (6.35 mm cylinders; commercially available from U.S. Stoneware) instead of the alumina media used in all other Examples.

TABLE 20

| Ex. | AS4, g | Nitric, g | Citric, g | DHO, g | Sintering aid; amount, g | MGN, g | Milling time, hrs. |
|---|---|---|---|---|---|---|---|
| 29 | 240 | 15.8 | 4.8 | 360 | — | 3.2* | 72 |
| 30 | 180 | 9 | — | 411 | — | 0.15** | 70 |
| 31 | 180 | 9 | — | 411 | — | 0.15** | 70 |
| 32–34 | 694 | 21 | 13.9 | 1205 | IO4; 210 | 9.5* | 72 |
| 35–39 | 600 | 36 | 12 | 2200 | — | — | 72 |
| 40–41 | 600 | 36 | 12 | 2200 | IO4; 182 | — | 72 |

*Added to dispersion after milling
**Added to dispersion before milling

The calcining, impregnation, and sintering information for Examples 29–41 are provided in Table 21, below.

TABLE 21

| Ex. | Calcining temp., °C. | Impregnate | Calcining temp., °C. | Sintering procedure | Sintering temp., °C. | Sintering time, min. |
|---|---|---|---|---|---|---|
| 29 | 700 | FeNO$_3$* | 700 | 1 | 1550 | 45 |
| 30 | 700 | REO | 700 | 1 | 1550 | 60 |
| 31 | 700 | FeNO$_3$* | 700 | 1 | 1550 | 60 |
| 32 | 1100 | REO | 1100 | 1 | 1430 | 30 |
| 33 | 1100 | REO | 1100 | 1 | 1440 | 30 |
| 34 | 1100 | REO | 1100 | 1 | 1450 | 30 |
| 35 | 1100 | — | — | 1 | 1450 | 60 |
| 36 | 1100 | — | — | 1 | 1500 | 60 |
| 37 | 1100 | — | — | 1 | 1550 | 60 |
| 38 | 1100 | REO | 1100 | 1 | 1450 | 90 |
| 39 | 1100 | REO | 1100 | 1 | 1450 | 120 |
| 40 | 1100 | — | — | 1 | 1450 | 120 |
| 41 | 1100 | REO | 1100 | 1 | 1450 | 120 |

*Sufficient ferric nitrate solution (10.5% Fe(NO$_3$)$_3$.9H$_2$O; available from Shepard Chemical) was used to provide the sintered abrasive grain with about 1% Fe$_2$O$_3$, calculated on a theoretical oxide basis.

The density values of the abrasive grain of Examples 29–41 are provided in Table 22, below.

TABLE 22

| Ex. | Density, g/cm$_3$ |
|---|---|
| 29 | 3.96 |
| 30 | 4.01 |
| 31 | 4.08 |
| 32 | 3.83 |
| 33 | 3.85 |
| 34 | 3.87 |
| 35 | 3.79 |
| 36 | 3.88 |
| 37 | 3.90 |
| 38 | 3.84 |
| 39 | 3.87 |
| 40 | 3.86 |
| 41 | 3.90 |

The grinding performance data for Examples 27–29 and 38–41, and Comparative Examples K, L, and M are provided in Table 23, below. The grain for Comparative Example K was heat fused alumina commercially available under the trade designation "BFRPL" from Treibacher of Austria.

TABLE 23

| Ex. | Grinding performance (Test proc. 1), % of Comp. M |
|---|---|
| 27 | 92 |
| 28 | 99 |
| 29 | 87 |
| 38/39* | 93 |
| 40 | 74 |
| 41 | 79 |
| Comp. K | 46 |
| Comp. L | 112 |
| Comp. M | 100 |

*Blend of 50% Example 38 abrasive grain and 50% Example 39 abrasive grain.

EXAMPLES 42–46

Examples 42–46 compared different techniques for sintering. The slurries for Examples 42–46 were made with 906 parts AS8, 13.5 parts nitric, 58.2 parts lanthanide nitrate solution (28% La(NO$_3$)$_3$.6H$_2$O; available from Molycorp), 58.2 parts neodymium nitrate solution (28% Nd(NO$_3$)$_3$.6H$_2$O; available from Molycorp), 85.7 parts ferric nitrate solution (10.5% FeNO$_3$)$_3$.9H$_2$O; available from Shepard Chemical), 79.4 parts MGN, 51 parts NH$_4$OH, and 1278 parts DHO. This was milled 72 hours. The slurry was dewatered, crushed, and the grits were calcined at 600° C.; they were not impregnated. The theoretical composition of the resulting grits, on a theoretical oxide basis, was 94.7% Al$_2$O$_3$, 0.9% Fe$_2$O$_3$, 1.7% Nd$_2$O$_3$, 1.7% La$_2$O$_3$, and 0.9% MgO. The sintering information for Examples 42–46 is provided in Table 24, below.

TABLE 24

| Ex. | Sintering procedure | Sintering Temp, °C. | Sintering time, min. | Comments |
|---|---|---|---|---|
| 42 | 1 | 1500 | 60 | |
| 43 | 2 | 1475 | | 1 RPM |
| 44 | 3 | 1475 1550 | 60 | 1 RPM, then |
| 45 | 1 | 1475 | | 1 RPM, two passes |
| 46 | 2 | 1475 | | 1 RPM, two passes |

The density and grinding performance values for the abrasive grain of Examples 42–46 and Comparative Example M is provided in Table 25, below.

TABLE 25

| Ex. | Density, g/cm$^3$ | Grinding performance (Test proc. 1), % of Comp. M |
|---|---|---|
| 42 | 3.85 | 64 |
| 43 | 3.75 | 37 |
| 44 | 3.88 | 60 |
| 45 | 3.82 | 55 |
| 46 | 3.85 | 60 |
| Comp. M | 3.88 | 100 |

EXAMPLES 47–49

Examples 47–49 compare different chi alumina powder sources. The raw materials used for the slurries for Examples 47–49 are listed in Table 26, below.

TABLE 26

| Ex. | Alumina; amount, g | Nitric, g | Citric, g | DHO, g | Sintering aid; amount, g | Milling time, hrs. |
|---|---|---|---|---|---|---|
| 47 | AS4; 600 | 18 | 12 | 1820 | — | 48 |
| 48 | AS9; 600 | 18 | 12 | 1580 | — | 48 |
| 49 | AS5; 480 | 10 | 10 | 1900 | IO1; 4.8 | 48 |

The calcining and impregnation for Examples 47 and 48 and the calcining, impregnation, and sintering information for Example 49 is provided in Table 27, below.

TABLE 27

| Ex. | Calcining temp., °C. | REO Impregnation | Calciting temp., °C. | Sintering procedure | Sintering temp., °C. | Sintering time, min. |
|---|---|---|---|---|---|---|
| 47 | 1100 | yes | 1100 | | | |
| 48 | 1100 | yes | 1100 | | | |
| 49 | 1000 | yes | 1000 | 3 | 1500 | 60 |

EXAMPLES 50–54

Examples 50–54 compare sintering methods. The slurries for Examples 50–54 were made with 800 parts AS6, 15 parts citric, 1980 parts DHO, and sufficient $NH_4OH$ to achieve a pH of about 8.5–9.0. The slurries were each milled for about 20 hours. The initial calcining temperature was 650° C. The calcining temperature after REO impregnation was 650° C. The sintering information is provided in Table 28, below.

TABLE 28

| Ex. | Sintering procedure | Sintering temp., °C. | Sintering time, min. |
|---|---|---|---|
| 50 | 1 | 1400 | 15 |
| 51 | 1 | 1425 | 20 |
| 52 | 3 | 1400 | 90 |
| 53 | 3 | 1425 | 30 |
| 54 | 3 | 1450 | 25 |

The density and hardness values for Examples 49–54 are provided in Table 29, below.

TABLE 29

| Ex. | Density, g/cm³ | Hardness, GPa |
|---|---|---|
| 49 | 3.90 | |
| 50 | 3.85 | |
| 51 | 3.92 | 20.6 |
| 52 | 3.95 | 21.1 |
| 53 | 3.95 | 21.5 |
| 54 | 3.97 | 22.2 |

EXAMPLES 55–67

The slurries for Examples 55–67 were prepared using a 380 liter (100 gallon) ball mill ($Al_2O_3$ tile lined mill; available from Paul O. Abbe of Little Falls, N.J., under the trade designation "ABBE 6PM PEBBLE MILL"). The mill was filled with 409 kg (900 lbs.) of alumina media (¼"; available from Coors of Golden, Colo.). The mill was run at 61% of the critical speed. The raw materials for the slurries for Examples 55–67 are listed in Table 30, below.

TABLE 30

| Ex. | AS5, kg | Nitric, g | Citric, g | DHO, kg | Sintering aid; amount, g | Mill time, hrs. |
|---|---|---|---|---|---|---|
| 55–59 | 11 | 330 | 110 | 80 | — | 72 |
| 60–67 | 10 | 500 | 100 | 60 | IO5; 3300 | 72 |

After milling, the slurries (i.e., one slurry for Examples 55–59 and one slurry for Examples 60–7) were each deaired and dried at about 100° C. The dried slurries were each crushed to provide grits.

For each of Examples 62–67, 300 grams of calcined material were washed in 9 parts nitric and 500 parts DHO. The grits for each example were soaked overnight in the respective nitric/DHO solution. For each of these examples, the liquid was decanted off, and the grits rinsed four times with fresh DHO.

The calcining and sintering information for Examples 55–67 is provided in Table 31, below.

TABLE 31

| Ex. | Calcining temp., °C. | Impregnate | Calcining temp., °C. | Sintering procedure | Sintering temp., °C. | Rotation |
|---|---|---|---|---|---|---|
| 55 | 700 | REO + (a) | 700 | 2 | 1420 | 2 RPM |
| 56 | 700 | REO | 700 | 2 | 1420 | 2 RPM - 2 passes |
| 57 | 700 | REO | 700 | 2 | 1420 | 5 RPM |

TABLE 31-continued

| Ex. | Calcining temp., °C. | Impregnate | Calcining temp., °C. | Sintering procedure | Sintering temp., °C. | Rotation |
|---|---|---|---|---|---|---|
| 58 | 700 | REO | 700 | 2 | 1420 | 4 RPM |
| 59 | 700 | REO | 700 | 2 | 1420 | 2 RPM |
| 60 | 700 | — | — | 2 | 1440 | 1 RPM |
| 61 | 700 | REO | 700 | 2 | 1440 | 1 RPM |
| 62 | 700 | REO | 700 | 2 | 1440 | 2 RPM |
| 63 | 700 | — | — | 2 | 1440 | 2 RPM |
| 64 | 700 | — | — | 2 | 1440 | 3 RPM |
| 65 | 700 | (b) | 700 | 2 | 1440 | 2 RPM |
| 66 | 700 | (c) | 700 | 2 | 1440 | 2 RPM |
| 67 | 700 | (d) | 700 | 2 | 1440 | 2 RPM |

(a) blending of 60 ml of REO and 9.5 grams of ferric nitrate solution (10.5% Fe(NO$_3$)$_3$.9H$_2$O) per 100 grams of calcined material
(b) sufficient amount of DHO added per 3.6 grams of magnesium nitrate solution (11% Mg(NO$_3$)$_2$.6H$_2$O) to provide 60 ml of solution
(c) sufficient amount of DHO added per 19.5 grams of lanthanum nitrate solution (28% La(NO$_3$)$_3$.6H$_2$O) to provide 60 ml of solution
(d) sufficient amount of DHO added per 19.5 grams of lanthanum nitrate solution (28% La(NO$_3$)$_3$.6H$_2$O), 9.1 grams of magnesium nitrate solution (11% Mg(NO$_3$)$_2$.6H$_2$O), and 2.5 grams of manganese nitrate solution (50% Mn(NO$_3$)$_2$) to provide 60 ml of solution.

The density, hardness, and grinding performance values for Examples 55–59 and Comparative Example L are provided in Table 32, below.

TABLE 32

| Ex. | Density, g/cm$^3$ | Hardness, GPa | Grinding performance (Test proc. 1), % of Comp. L |
|---|---|---|---|
| 55 | 3.87 | | 98 |
| 56 | 3.87 | | 99 |
| 57 | 3.74 | | 96 |
| 58 | 3.77 | | 101 |
| 59 | 3.84 | 17.0 | 105 |
| Comp. L | 3.90 | 22 | 100 |

The density, hardness, and grinding performance values for Examples 60–67, and Comparative Example L are provided in Table 33, below.

TABLE 33

| Ex. | Density, g/cm$^3$ | Hardness, GPa | Grinding performance (Test proc. 3), % of Comp. L |
|---|---|---|---|
| 60 | 3.86 | 20.0 | 95 |
| 61 | 3.88 | 20.3 | 103 |
| 62 | 3.93 | 19.3 | 101 |
| 63 | 3.87 | 20.4 | 106 |
| 64 | 3.91 | 20.1 | 110 |
| 65 | 3.84 | 20.2 | 106 |
| 66 | 3.87 | 18.9 | 107 |
| 67 | 3.93 | | 103 |
| Comp. L | 3.90 | | 100 |

EXAMPLES 68–70

Examples 68–70 compare different impregnates. The raw materials for the slurries for Examples 68–70 were 120 parts AS6, 6 parts nitric, and 600 parts DHO. The slurries were each milled for 48 hours. The slurry was deaired, dried, and then crushed to form grits. The grits were calcined at 650° C., and impregnated as followings. Example 68 calcined material was impregnated with REO. The impregnation solution for Example 69 was prepared by adding a sufficient amount of DHO per 5 grams of manganese nitrate solution (50% Mn(NO$_3$)$_2$; available from Mallinckrodt Chemical) to provide 60 ml of solution. The solution for Example 70 was prepared by a sufficient amount of DHO per 14.3 grams of lanthanum nitrate solution (28% La(NO$_3$)$_3$.6H$_2$O), 9.1 grams of MGN, and 2 grams of manganese nitrate solution (50% Mn(NO$_3$)$_2$) to provide 60 ml of solution. The impregnated grits were then calcined again at 650° C., then sintered according to Sintering Procedure 1 for 20 minutes at 1425° C.

The density and hardness values for the abrasive grain of Examples 68–70 are provided in Table 34, below.

TABLE 34

| Ex. | Density, g/cm$^3$ | Hardness, GPa |
|---|---|---|
| 68 | 3.88 | |
| 69 | 3.86 | |
| 70 | 3.88 | 18.8 |

EXAMPLES 71–81

Examples 71–81 illustrates the use of gamma alumina as the alumina source. The raw materials used for each of the Examples 71–81 are listed in Table 35, below.

TABLE 35

| Ex. | Alumina source; amount, g | Nitric, g | Citric, g | DHO, g | 11% Mg(NO$_3$)$_2$.6H$_2$O, g | Milling time, hrs. |
|---|---|---|---|---|---|---|
| 71–74 | AS10; 180 | 9 | 1.8 | 750 | — | 24 |
| 75–77 | AS11; 180 | 9 | 1.8 | 1250 | — | 24 |
| 78–79 | AS12; 180 | 9 | — | 1200 | — | 28 |
| 80–81 | AS10; 250 | 12.5 | 2.5 | 750 | 5 | 24 |

The impregnating and sintering information for Examples 71–81 is provided in Table 36, below. Examples 71–81 were calcined at 650° C. and then sintered according to the conditions listed.

TABLE 36

| Ex. | REO Impregnation | Sintering procedure | Sintering temp., °C. | Sintering time, min. |
|---|---|---|---|---|
| 71 | yes | 1 | 1425 | 20 |
| 72 | yes | 1 | 1425 | 35 |
| 73 | yes | 1 | 1450 | 13 |
| 74 | yes | 1 | 1400 | 20 |
| 75 | yes | 1 | 1425 | 20 |
| 76 | yes | 1 | 1425 | 60 |
| 77 | yes | 3 | 1425 | 30 |
| 78 | no | 1 | 1425 | 20 |
| 79 | yes | 1 | 1425 | 20 |
| 80 | yes | 1 | 1425 | 20 |
| 81 | yes | 1 | 1400 | 20 |

The density and hardness values for the abrasive grain of Examples 71–81 are provided in Table 37, below.

TABLE 37

| Ex. | Density, g/cm$^3$ | Hardness, GPa |
|---|---|---|
| 71 | 3.89 | 18.5 |
| 72 | 3.90 | |
| 73 | 3.90 | |
| 74 | 3.86 | |
| 75 | 3.88 | 18.9 |
| 76 | 3.90 | 18.4 |
| 77 | 3.89 | 19.3 |
| 78 | 3.83 | 21.4 |
| 79 | 3.90 | 19.5 |
| 80 | 3.91 | |
| 81 | 3.90 | 18.6 |

Examples 81/K was made as a 42:58 ratio of Example 81 to Comparative Example K. Comparative Example L/K was a 42:58 ratio of Comparative Example L to Comparative Example K. A CaCO$_3$ containing size was used in the disc. The grinding performance data is provided in Table 38, below.

TABLE 38

| Ex. | Grinding performance, (Test Proc. 1), of Comp. L |
|---|---|
| 81 | 85 |
| 81/K | 75 |
| Comp. L/K | 69 |
| Comp. L | 100 |

EXAMPLE 82

A 2 liter, rubber-lined ball mill was charged with 4600 grams of zirconia mill media (1.3 cm diameter cylinders; available from Stoneware Corp. of Mahwah, N.J.), 600 grams of AFA and 10.0 grams of AS2. The ball mill was rotated at 70 rpm for 24 hours. The resulting dispersion was rotary evaporated (60° C., aspirator pressure) to a viscous residue. This viscous residue was dried at 80° C. to produce granular particles.

The granular particles were calcined by heating from room temperature to 600° C. over a two hour period (and then cooled to room temperature) in a conventional box furnace. The calcined material was sintered in a rapid heating box furnace employing molybdenum disilicide heating elements (available from CM, Inc., of Bloomfield, N.J.). The calcined material was heated from room temperature to 1400° C. in air in less than 8 minutes and then held at 1400° C. for 5 minutes. After cooling, the resulting grit appeared shiny and dense.

Examination of crushed pieces of the grit by scanning electron microscopy (SEM) revealed that the fired material had a density of at least 95% of theoretical density and alpha alumina crystallites having an average crystallite diameter of less than 0.5 micrometer.

EXAMPLE 83

A 2 liter stirred autoclave (available from Paar Instrument Co. of Moline, Ill.) was charged with 600 grams of DHO. While stirring rapidly with a conventional homogenizer (available under the trade designation "OMNI 5000 HOMOGENIZER" from OMNI International, Inc. of Waterbury, Conn.), 1000 grams of AS7 was added in 40 gram portions. 10 ml of nitric was then added and the mixture was mixed at high speed for 5 minutes. The resulting dispersion was autoclaved at 190° C. for 1 hour. After cooling the dispersion was poured into a large beaker, covered, and allowed to settle for 3 weeks. The slightly turbid supernatant (about 150 ml) was separated by decanting. The remaining dispersion dried at 85° C. for 3 days.

The resulting dried cake was calcined in a conventional box furnace according to the following schedule:

room temperature to 100° C. at 10° C./min.; 100° C. to 1000° C. at 5° C./min.; and cooled in the furnace to room temperature.

Portions of the calcined cake were crushed and fired at either 1450° C. or 1500° C. for 10 minutes as described in Example 82 (above). Examination by SEM of crushed pieces of the grit fired at 1450° C. revealed that the material had alpha alumina crystallites having an average crystallite size of less than 1 micrometer. Further, SEM examination of fracture surfaces of the material fired at 1450° C. revealed a preponderance of transgranular fracture. The density, as determined by Archimedes Method, was greater than about 90% of theoretical.

The grits fired at 1500° C. were significantly harder and more difficult to crush than was the material fired at 1450° C. SEM examination of crushed pieces of the grit fired at 1500° C. revealed that the material had alpha alumina crystallites having an average crystallite size between 1.0 and 1.5 micrometer. The density, as determined by Archimedes Method, was greater than about 92% of theoretical.

EXAMPLE 84

A concentrated dispersion of alumina in water was prepared as follows. A beaker was charged with 181.88 grams of DHO and about 1.44 grams of an acrylic acid-itaconic acid copolymer (AA-ICA) (ratio of acrylic acid monomer to itaconic acid monomer of 2:1 dispersant prepared according to the method described in Example 3 of U.S. Pat. No. 5,130,347, the disclosure of which is incorporated herein by reference, except dimethylformamide was used as the solvent in place of THF. While stirring rapidly with a conventional homogenizer ("OMNI 5000 HOMOGENIZER"), 178.88 grams of AS7 was added to the water/dispersant mixture. An additional 1.44 grams of the dispersant (AA-ICA) was then added followed by an additional 178.88 grams of AS7. This process was repeated until 5.73 grams of dispersant ("AA-ICA") and 712.5 grams of AS7 were well mixed in the 181.88 grams of water to provide the dispersion.

The resulting dispersion was poured into a shallow aluminum tray and dried overnight at 85° C. The resulting dried solid was calcined according to the following schedule:

room temperature to 100° C. at 10° C./min.; 100° C. to 1000° C. at 5° C./min.; and cooled in the furnace to room temperature.

Portions of the calcined cake were crushed and fired at either 1400° C. or 1450° C. for 10 minutes as described in Example 82 (above). Examination by SEM of crushed pieces of the grit fired at 1400° C. revealed that the material had alpha alumina crystallites having an average crystallite size of less than 0.8 micrometer. Further, SEM examination of fracture surfaces of the material fired at 1400° C. revealed a preponderance of intragranular fracture. The a density, as determined by Archimedes Method, was greater than about 88% of theoretical.

The grits fired at 1450° C. were significantly harder and more difficult to crush than was the material fired at 1400° C. SEM examination of crushed pieces of the grit fired at 1450° C. revealed that the material had alpha alumina crystallites having an average crystallite size of less than 0.8 micrometer. The porosity present in the material fired at 1450° C. was mostly in the form of pores less than 0.1 micrometer in diameter located at triple points. Further, SEM examination of fracture surfaces of the material fired at 1450° C. revealed a preponderance of transgranular fracture. The density, as determined by Archimedes Method, was greater than about 90% of theoretical.

EXAMPLE 85

A dispersion was prepared as described in Example 84 except 652.24 grams of AS13 was dispersed in 130 grams of DHO with 3.75 grams of dispersant ("AA-ICA"). A portion of this dispersion was poured into a shallow aluminum tray, loosely covered with a watch glass, and dried overnight at 85° C. The dried solid was calcined according to the schedule outlined in Example 84. Portions of the calcined material were crushed and fired at either 1400° C. or 1450° C. for 10 minutes as described in Example 82 (above).

Examination by SEM of crushed pieces of the grit fired at 1400° C. revealed that the material had a density greater than about 90% of theoretical and alpha alumina having an average crystallite size of less than 0.5 micrometer. Further, SEM examination of fracture surfaces of the material fired at 1400° C. revealed a preponderance of intragranular fracture.

The grits fired at 1450° C. were significantly harder and more difficult to crush than was the material fired at 1400° C. SEM examination of crushed pieces of the grit fired at 1450° C. revealed that the material had a density greater than about 93% of theoretical and alpha alumina crstallites having an average crystallite size of 0.5 micrometer. Further, SEM examination of fracture surfaces of the material fired at 1450° C. revealed both intra- and transgranular fracture.

EXAMPLE 86

Example 86 was prepared as described in Example 84, except 200 grams of AS7 was dispersed in 198 grams of DHO with 2.0 grams of dispersant ("AA-ICA"). The resulting dispersion was allowed to settle undisturbed for 1 week. The dispersion was then dried at 95° C. and calcined according to the schedule outlined in Example 84. A portion of the calcined material was crushed and fired at either 1400° C. for 10 minutes as described in Example 82 (above).

The fired grits were hard and difficult to crush. Examination by SEM of crushed pieces of the fired grit revealed that the material had a density greater than about 90% of theoretical, with many pieces having a density greater than 95% of theoretical. The average diameter of the alpha alumina crystallites was less than 1.0 micrometer.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A method for making an abrasive article, said method comprising the steps of:

(a) preparing a dispersion comprising a liquid medium and a sufficient amount of alpha alumina particles which, after steps (b) and (c), provides a plurality of crystalline ceramic, alpha alumina-based abrasive grain having a hardness of at least 16 GPa, a density of at least 3.58 g/cm$^3$, an average alpha alumina crystallite size of less than 2 micrometer, and, on a theoretical oxide basis, less than 0.3 percent by weight $SiO_2$ and no more than 0.4 percent by weight $Na_2O$, based on the total weight of said abrasive grain, said alpha alumina particles having an average size of less than 2 micrometer, said dispersion containing no more than 1% by weight alpha alumina monohydrate, based on the total solids content of said dispersion;

(b) deliquifying said dispersion to provide alpha alumina-based abrasive grain precursor material;

(c) sintering said precursor material at a temperature no greater than 1600.0° C. and at a pressure no greater than 100.0 atm for a time sufficient to provide said plurality of abrasive grain; and (d) combining at least a portion of said plurality of abrasive grain with binder to provide said abrasive article.

2. The method according to claim 1 wherein at least 15 percent by weight of the abrasive grain present in said abrasive article are said crystalline ceramic, alpha alumina-based abrasive grain.

3. The method according to claim 2 wherein said dispersion further comprises a sufficient amount of sintering aid material which, after steps (b) and (c), provides the plurality of abrasive grain having a hardness of at least 16 GPa, a density of at least 3.58 g/cm$^3$, and an average alpha alumina crystallite size of less than 2 micrometer.

4. The method according to claim 3 wherein said sintering aid material is selected from the group of: magnesium oxide, manganese oxide, zinc oxide, cerium oxide, cobalt oxide, titanium oxide, nickel oxide, yttrium oxide, praseodymium oxide, samarium oxide, ytterbium oxide, neodymium oxide, lanthanum oxide, gadolinium oxide, dysprosium oxide, erbium oxide, precursors thereof, and combinations thereof.

5. The method according to claim 3 wherein said dispersion further comprises a material selected from the group of: zirconium oxide, hafnium oxide, chromium oxide, precursors thereof, and combinations thereof.

6. The method according to claim 3 including a step of calcining between steps (b) and (c).

7. The method according to claim 3 wherein said abrasive grain includes, on a theoretical oxide basis, no more than 0.4 percent by weight CaO, based on the total weight of said abrasive grain.

8. The method according to claim 7 wherein said sintering aid material is selected from the group of: magnesium oxide, manganese oxide, zinc oxide, cerium oxide, cobalt oxide, titanium oxide, nickel oxide, yttrium oxide, praseodymium oxide, samarium oxide, ytterbium oxide, neodymium oxide, lanthanum oxide, gadolinium oxide, dysprosium oxide, erbium oxide, precursors thereof, and combinations thereof.

9. The method according to claim 7 wherein said dispersion further comprises a material selected from the group of: zirconium oxide, hafnium oxide, chromium oxide, precursors thereof, and combinations thereof.

10. The method according to claim 7 including a step of calcining between steps (b) and (c).

11. The method according to claim 7 wherein said sintering aid material is a salt of a metal selected from the group of: cerium, praseodymium, samarium, ytterbium, neodymium, lanthanum, gadolinium, dysprosium, erbium, and combinations thereof.

12. The method according to claim 8 wherein said sintering aid is a combination of (a) a precursor salt of magnesium and (b) a precursor salt of a metal selected from the group of: cerium, praseodymium, samarium, ytterbium, neodymium, yttrium, lanthanum, gadolinium, dysprosium, erbium, and combinations thereof.

13. The method according to claim 7 including a step of shaping the dispersion.

14. The method according to claim 7 wherein said binder is an organic binder.

15. The method according to claim 7 wherein said abrasive article is a coated abrasive.

16. The method according to claim 2 including a step of calcining between steps (b) and (c).

17. The method according to claim 2 wherein said binder is an organic binder.

18. The method according to claim 2 wherein said abrasive article is a coated abrasive.

19. A method for making an abrasive article, said method comprising the steps of:

(a) preparing a dispersion comprising a liquid medium and a sufficient amount of alumina particles which, after steps (b) and (c), provides a plurality of crystalline ceramic, alpha alumina-based abrasive-grain having a hardness of at least 16 GPa, a density of at least 3.58 g/cm$^3$, an average alpha alumina crystallite size of less than 2 micrometer, and, on a theoretical oxide basis, less than 0.3 percent by weight SiO$_2$ and no more than 0.4 percent by weight Na$_2$O, based on the total weight of said abrasive grain; said alumina particles being selected from the group consisting of: (i) transitional alumina particles containing less than 10% by weight chemically bound water and (ii) alpha alumina particles and said transitional alumina particles, said alumina particles having an average size of less than 2 micrometer, said dispersion containing no more than 1% by weight alpha alumina monohydrate, based on the total solids content of said dispersion;

(b) deliquifying said dispersion to provide alpha alumina-based abrasive grain precursor material;

(c) sintering said precursor material at a temperature no greater than 1600.0° C. and at a pressure no greater than 100.0 atm for a time sufficient to provide said plurality of abrasive grain; and (d) combining at least a portion of said plurality of abrasive grain with binder to provide said abrasive article.

20. The method according to claim 19 wherein at least 15 percent by weight of the abrasive grain present in said abrasive article are said crystalline ceramic, alpha alumina-based abrasive grain.

21. The method according to claim 20 wherein said dispersion further comprises a sufficient amount of said sintering aid material which, after steps (b) and (c), provides the plurality of abrasive grain having a hardness of at least 16 GPa, a density of at least 3.58 g/cm$^3$, and an average alpha alumina crystallite size of less than 2 micrometer.

22. The method according to claim 21 wherein said sintering aid material is selected from the group of: magnesium oxide, manganese oxide, zinc oxide, cerium oxide, cobalt oxide, titanium oxide, nickel oxide, yttrium oxide, praseodymium oxide, samarium oxide, ytterbium oxide, neodymium oxide, lanthanum oxide, gadolinium oxide, dysprosium oxide, erbium oxide, precursors thereof, and combinations thereof.

23. The method according to claim 21 wherein said dispersion further comprises a material selected from the group of: zirconium oxide, hafnium oxide, chromium oxide, precursors thereof, and combinations thereof.

24. The method according to claim 21 wherein said alumina particles are said alpha alumina particles and said transitional alumina particles.

25. The method according to claim 21 including a step of calcining between steps (b) and (c).

26. The method according to claim 21 wherein said abrasive grain includes, on a theoretical oxide basis, no more than 0.4 percent by weight CaO, based on said total weight of the abrasive grain.

27. The method according to claim 26 wherein said sintering aid material is selected from the group of: magnesium oxide, manganese oxide, zinc oxide, cerium oxide, cobalt oxide, titanium oxide, nickel oxide, yttrium oxide, praseodymium oxide, samarium oxide, ytterbium oxide, neodymium oxide, lanthanum oxide, gadolinium oxide, dysprosium oxide, erbium oxide, precursors thereof, and combinations thereof.

28. The method according to claim 26 wherein said dispersion further comprises a material selected from the group of: zirconium oxide, hafnium oxide, chromium oxide, precursors thereof, and combinations thereof.

29. The method according to claim 26 including a step of calcining between steps (b) and (c).

30. The method according to claim 26 wherein said sintering aid material is a salt of a metal selected from the group of: cerium, praseodymium, samarium, ytterbium, neodymium, lanthanum, gadolinium, dysprosium, erbium, and combinations thereof.

31. The method according to claim 26 wherein said sintering aid is a combination of (a) a precursor salt of magnesium and (b) a precursor salt of a metal selected from the group of: cerium, praseodymium, samarium, ytterbium, neodymium, yttrium, lanthanum, gadolinium, dysprosium, erbium, and combinations thereof.

32. The method according to claim 26 including a step of shaping the dispersion.

33. The method according to claim 21 wherein said binder is an organic binder.

34. The method according to claim 21 wherein said abrasive article is a coated abrasive.

35. The method according to claim 20 including a step of calcining between steps (b) and (c).

36. The method according to claim 20 wherein said binder is an organic binder.

37. The method according to claim 20 wherein said abrasive article is a coated abrasive.

38. A method for making an abrasive article, said method comprising the steps of:
(a) preparing a dispersion comprising a liquid medium, a sufficient amount of sintering aid material selected from the group consisting of yttrium oxide, cerium oxide, praseodymium oxide, samarium oxide, ytterbium oxide, neodymium oxide, lanthanum oxide, gadolinium oxide, dysprosium oxide, erbium oxide, precursors thereof, and combinations thereof, and a sufficient amount of alpha alumina particles, which, after steps (b) and (c), provides a plurality of crystalline ceramic, alpha alumina-based abrasive grain comprising at least 2 percent by weight, on a theoretical oxide basis, $Y_2O_3$, $Ce_2O_3$, $Pr_2O_3$, $Sm_2O_3$, $Yb_2O_3$, $Nd_2O_3$, $La_2O_3$, $Gd_2O_3$, $Dy_2O_3$, $Er_2O_3$, or a combination thereof, based on the total weight of said abrasive grain, having a hardness of at least 16 GPa, a density of at least 3.58 g/cm$^3$, an average alpha alumina crystallite size of less than 2 micrometer, and; said alpha alumina particles having an average size of less than 2 micrometer, wherein said dispersion comprises at least about 65 percent by weight of said alpha alumina particles, based on the total theoretical $Al_2O_3$ content of said dispersion;
(b) deliquifying said dispersion to provide alpha alumina-based abrasive grain precursor material;
(c) sintering said precursor material at a temperature no greater than 1600.0° C. and at a pressure no greater than 100.0 atm for a time sufficient to provide said plurality of abrasive grain; and
(d) combining at least a portion of said plurality of abrasive grain with binder to provide said abrasive article.

39. The method according to claim 38 wherein at least 15 percent by weight of the abrasive grain present in said abrasive article are said crystalline ceramic, alpha alumina-based abrasive grain.

40. The method according to claim 39 wherein said dispersion comprises at least about 75 percent by weight of said alpha alumina particles.

41. The method according to claim 40 wherein said abrasive grain has, on a theoretical oxide basis, less than 0.3 percent by weight $SiO_2$ and no more than 0.4 percent by weight $Na_2O$, based on the total weight of said abrasive grain.

42. The method according to claim 40 wherein said abrasive grain has, on a theoretical oxide basis, less than 0.3 percent by weight $SiO_2$, no more than 0.4 percent by weight $Na_2O$, and no more than 0.4 percent by weight CaO, based on the total weight of said abrasive grain.

43. The method according to claim 40 wherein said dispersion further comprises a material selected from the group of: zirconium oxide, hafnium oxide, chromium oxide, precursors thereof, and combinations thereof.

44. The method according to claim 40 including a step of calcining between steps (b) and (c).

45. The method according to claim 39 wherein said dispersion comprises at least about 80 percent by weight of said alpha alumina particles.

46. The method according to claim 39 wherein said binder is an organic binder.

47. The method according to claim 39 wherein said abrasive article is a coated abrasive.

48. A method for making an abrasive article, said method comprising the steps of:
(a) preparing a dispersion comprising a liquid medium, a sufficient amount of sintering aid material selected from the group consisting of yttrium oxide, cerium oxide, praseodymium oxide, samarium oxide, ytterbium oxide, neodymium oxide, lanthanum oxide, gadolinium oxide, dysprosium oxide, erbium oxide, precursors thereof, and combinations thereof, and a sufficient amount of alumina particles which, after steps (b) and (c), provides a plurality of crystalline ceramic, alpha alumina-based abrasive grain comprising at least 2 percent by weight, on a theoretical oxide basis, $Y_2O_3$, $Ce_2O_3$, $Pr_2O_3$, $Sm_2O_3$, $Yb_2O_3$, $Nd_2O_3$, $La_2O_3$, $Gd_2O_3$, $Dy_2O_3$, $Er_2O_3$, or a combination thereof, based on the total weight of said abrasive grain, having a hardness of at least 16 GPa, a density of at least 3.58 g/cm$^3$, an average alpha alumina crystallite size of less than 2 micrometer; said alumina particles being selected from the group consisting of: (i) transitional alumina particles containing less than 10% by weight chemically bound water and (ii) alpha alumina particles and said transitional alumina particles, said alumina particles having an average size of less than 2 micrometer, wherein said dispersion comprises at least about 65 percent by weight of said alumina particles, based on the total theoretical $Al_2O_3$ content of said dispersion;
(b) deliquifying said dispersion to provide alpha alumina-based abrasive grain precursor material;
(c) sintering said precursor material at a temperature no greater than 1600.0° C. and at a pressure of no greater than 100.0 atm for a time sufficient to provide said plurality of abrasive grain; and
(d) combining at least a portion of plurality of said abrasive grain with binder to provide said abrasive article.

49. The method according to 48 wherein at least 15 percent by weight of the abrasive grain present in said abrasive article are said crystalline ceramic, alpha alumina-based abrasive grain.

50. The method according to claim 49 wherein said dispersion comprises at least about 75 percent by weight of said alumina particles.

51. The method according to claim 50 wherein said abrasive grain has, on a theoretical oxide basis, less than 0.3 percent by weight $SiO_2$ and no more than 0.4 percent by weight $Na_2O$, based on the total weight of said abrasive grain.

52. The method according to claim 50 wherein said abrasive grain has, on a theoretical oxide basis, less than 0.3 percent by weight $SiO_2$, no more than 0.4 percent by weight $Na_2O$, and no more than 0.4 percent by weight $CaO$, based on the total weight of said abrasive grain.

53. The method according to claim 50 wherein said dispersion further comprises a material selected from the group of: zirconium oxide, hafnium oxide, chromium oxide, precursors thereof, and combinations thereof.

54. The method according to claim 50 including a step of calcining between steps (b) and (c).

55. The method according to claim 49 wherein said dispersion comprises at least about 80 percent by weight of said alumina particles.

56. The method according to claim 49 wherein said binder is an organic binder.

57. The method according to claim 49 wherein said abrasive article is a coated abrasive.

* * * * *

UNITED STATES PATENT AND TRADEMARK OFFICE
CERTIFICATE OF CORRECTION

PATENT NO.: 5,645,618

DATED: July 8, 1997

INVENTOR(S): Larry D. Monroe and Thomas E. Wood

It is certified that error appears in the above-identified patent and that said Letters Patent is hereby corrected as shown below:

In column 4, line 6, "16 Spa" should be --16 GPa--.

In column 11, line 41 "(3Al$_2$O$_3$.2SiO$_2$)" should be --(3Al$_2$O$_3$•2SiO$_2$)--.

In column 16, line 58, "N-(hydroxymethyl)acrylamide" should be --N-(hydroxymethyl)-acrylamide--

In column 19, line 38, "Mg(NO$_3$)$_3$.6H$_2$O" should be --Mg(NO$_3$)$_3$•6H$_2$O--.

In column 19, line 43, "La(NO$_3$)$_3$.6H$_2$O" should be --La(No$_3$)$_3$•6H$_2$O--.

In column 19, line 43, "Nd(NO$_3$)$_3$.6H$_2$O" should be --Nd(NO$_3$)$_3$•6H$_2$O--.

In column 19, line 44, "Y(NO$_3$)$_3$.6H$_2$O" should be --Y(NO$_3$)$_3$•6H$_2$O--.

In column 19, line 46, "Co(NO$_3$)$_2$.6H$_2$O" should be --Co(NO$_3$)$_2$•6H$_2$O--.

In column 19, line 48, "La(NO$_3$)$_3$.6H$_2$O" should be --La(NO$_3$)$_3$•6H$_2$O--.

In column 19, line 49, "Nd(NO$_3$)$_3$.6H$_2$O" should be --Nd(NO$_3$)$_3$•6H$_2$O--.

In column 19, line 49, "Y(NO$_3$)$_3$.6H$_2$O" should be --Y(NO$_3$)$_3$•6H$_2$O--.

In column 19, line 50, "Mg(NO$_3$)$_2$.6H$_2$O" should be --MG(NO$_3$)$_2$•6H$_2$O--.

In column 19, line 50, "Co(NO$_3$)$_2$.6H$_2$O" should be --Co(NO$_3$)$_2$•6H$_2$O--.

In column 28, line 66 "was sintered at using sintering" should be --was sintered at 1450°C using sintering--

UNITED STATES PATENT AND TRADEMARK OFFICE
CERTIFICATE OF CORRECTION

PATENT NO.: 5,645,618
DATED: July 8, 1997
INVENTOR(S): Larry D. Monroe and Thomas E. Wood It is certified that error appears in the above-identified patent and that said Letters Patent is hereby corrected as shown below:

In column 30, line 63, "La(NO$_3$)$_3$.6H$_2$O" should be --La(NO$_3$)$_3$•6H$_2$O--.

In column 30, line 63, "Nd(NO$_3$)$_3$.6H$_2$O" should be -- Nd(NO$_3$)$_3$•6H$_2$O--.

In column 30, line 64 "Y(NO$_3$)$_3$.6H$_2$O" should be -- Y(NO$_3$)$_3$•6H$_2$O--.

In column 30, line 67, "Nd(NO$_3$)$_3$.6H$_2$O" should be --Nd(NO$_3$)$_3$•6H$_2$O--

In column 31, line 1, "$_3$.6H$_2$O" should be --$_3$•6H$_2$O--.

In column 31, line 1, "Mg(NO$_3$)$_3$.6H$_2$O" should be --Mg(No$_3$)$_3$•6H$_2$O--.

In column 31, line 4, "La(NO$_3$)$_3$.6H$_2$O" should be --La(NO$_3$)$_3$•6H$_2$O--.

In column 31, line 5, "$_3$.6H$_2$O" should be --$_3$•6H$_2$O--.

In column 31, line 5, "Y(NO$_3$)$_2$.6H$_2$O" should be --Y(NO$_3$)$_2$•6H$_2$O--.

In column 31, line 8, "La(NO$_3$)$_3$.6H$_2$O" should be --La(NO$_3$)$_3$•6H$_2$O--.

In column 31, line 8, "Nd(NO$_3$)$_3$.6H$_2$O" should be --Nd(NO$_3$)$_3$•6H$_2$O--.

In column 31, line 9, "Y(NO$_3$)$_3$.6H$_2$O" should be --Y(NO$_3$)$_3$•6H$_2$O--.

In column 31, line 9, "Mg(NO$_3$)$_2$.6H$_2$O" should be --MG(NO$_3$)$_2$•6H$_2$O--.

In column 34, line 22, "$_3$.6H$_2$O" should be --$_3$•6H$_2$O--.

In column 34, line 23, "FeNO$_3$)$_3$.9H$_2$O" should be --FeNO$_3$)$_3$•9H$_2$O--

In column 37, line 14, "Fe(NO$_3$)$_3$.9H$_2$O" should be --Fe(NO$_3$)$_3$•9H$_2$O--.

UNITED STATES PATENT AND TRADEMARK OFFICE
CERTIFICATE OF CORRECTION

PATENT NO.: 5,645,618
DATED: July 8, 1997
INVENTOR(S): Larry D. Monroe and Thomas E. Wood It is certified that error appears in the above-identified patent and that said Letters Patent is hereby corrected as shown below:

In column 37, line 17, "$Mg(NO_3)_3.6H_2O$" should be --$Mg(NO_3)_3 \bullet H_2O$--.

In column 37, line 19, "$La(NO_3)_3.6H_2O$" should be --$La(NO_3)_3 \bullet 6H_2O$--.

In column 37, line 21 "$La(NO_3)_3.6H_2O$" should be --$La(NO_3)_3 \bullet 6H_2O$--.

In column 37, line 21, "$Mg(NO_3)_3.6H_2O$" should be -- $Mg(NO_3)_3 \bullet 6H_2O$--

In column 38, line 34, "$La(NO_3)_3.6H_2O$" should be -- $La(No_3)_3 \bullet 6H_2O$--.

In column 39, line 4, "$Mg(NO_3)_2.6HO$" should be -- $Mg(NO_3)_2 \bullet 6HO$--.

In column 43, line 58, "claim 8" should be --claim 7--.

Signed and Sealed this

First Day of May, 2001

Attest:

NICHOLAS P. GODICI

Attesting Officer

Acting Director of the United States Patent and Trademark Office